(12) United States Patent
Ranjith Kumar et al.

(10) Patent No.: US 11,820,594 B2
(45) Date of Patent: Nov. 21, 2023

(54) AUTOMATED SHUTTLE SYSTEMS FOR MULTI-DEPTH STORAGE RACKS

(71) Applicant: INTELLIGRATED HEADQUARTERS, LLC, Mason, OH (US)

(72) Inventors: Krishna Praveen Ranjith Kumar, Charlotte, NC (US); Srinivasa Rao Gudi, Charlotte, NC (US); Santhosh Kumar Urukonda, Charlotte, NC (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/196,423

(22) Filed: Mar. 9, 2021

(65) Prior Publication Data

US 2021/0284444 A1 Sep. 16, 2021

(30) Foreign Application Priority Data

Mar. 16, 2020 (IN) .............................. 202011011218

(51) Int. Cl.
*B65G 1/04* (2006.01)
*B65G 1/06* (2006.01)
*B65G 1/137* (2006.01)

(52) U.S. Cl.
CPC ........... *B65G 1/0492* (2013.01); *B65G 1/065* (2013.01); *B65G 1/1373* (2013.01)

(58) Field of Classification Search
CPC ..... B65G 1/0492; B65G 1/065; B65G 1/1373
See application file for complete search history.

(56) References Cited

U.S. PATENT DOCUMENTS

| 5,407,316 A | 4/1995 | Coatta et al. |
| 7,771,152 B2 | 8/2010 | Waltersbacher |
| (Continued) | | |

FOREIGN PATENT DOCUMENTS

| CN | 103153822 A | 6/2013 |
| CN | 104470830 A | 3/2015 |
| (Continued) | | |

OTHER PUBLICATIONS

"DAMBACH Compact Shuttle, Multi-Deep Storage." Bastian Solutions, www.bastiansolutions.com/solutions/technology/asrs/compact-shuttle. Accessed Jun. 4, 2021.
(Continued)

*Primary Examiner* — Saul Rodriguez
*Assistant Examiner* — Ashley K Romano
(74) *Attorney, Agent, or Firm* — Alston & Bird LLP

(57) ABSTRACT

A method and associated apparatus are provided for retrieving an object from a multi-depth object storage. The method includes retrieving, via a shuttle, at least a first object from a first depth of a storage location and a second object from a second depth of the storage location. The first depth is less than the second depth, such that the first object positioned at the first depth interferes with retrieval of the second object positioned at the second depth. The method also includes manipulating the first object and the second object, such that the first object is positioned to be disposed into the storage location while the second object remains disposed on the shuttle. The method further includes disposing the first object into the storage location while the second object remains on the shuttle. A corresponding apparatus is also provided.

20 Claims, 17 Drawing Sheets

(56) References Cited

U.S. PATENT DOCUMENTS

| | | | |
|---|---|---|---|
| 9,378,482 | B1 | 6/2016 | Pikler et al. |
| 11,407,587 | B1* | 8/2022 | Dwivedi ............. B65G 47/902 |
| 2007/0071585 | A1 | 3/2007 | Henkel |
| 2011/0008138 | A1 | 1/2011 | Yamashita |
| 2012/0099953 | A1 | 4/2012 | Hortig et al. |
| 2015/0259141 | A1 | 9/2015 | Fumie |
| 2018/0319590 | A1* | 11/2018 | Lindbo ................... G07F 17/12 |
| 2021/0032034 | A1* | 2/2021 | Kalouche ............... B25J 9/1689 |
| 2021/0229910 | A1* | 7/2021 | Fjeldheim ............. B65G 1/0478 |
| 2021/0331868 | A1* | 10/2021 | Huang ................. G06Q 10/087 |
| 2022/0097967 | A1* | 3/2022 | Austrheim ........... B65G 1/0492 |
| 2022/0129833 | A1* | 4/2022 | Gil ....................... G06Q 10/083 |

FOREIGN PATENT DOCUMENTS

| | | |
|---|---|---|
| CN | 207580616 U | 7/2018 |
| DE | 4400829 A1 | 7/1994 |
| DE | 102006049411 A1 | 4/2008 |
| DE | 102011002322 A1 | 10/2012 |
| EP | 0733563 A1 | 9/1996 |

OTHER PUBLICATIONS

European Search Report and Search Opinion received for EP Application No. 21160553.0, dated Nov. 10, 2021, 10 pages.
CN Office Action dated Jan. 19, 2023 for CN Application No. 202110190693.
CN Office Action dated Jun. 30, 2022 for CN Application No. 202110190693.
English Translation of CN Office Action dated Jun. 30, 2022 for CN Application No. 202110190693.
English Translation of CN Office Action dated Jan. 19, 2023 for CN Application No. 202110190693, 11 page(s).
CN Notice of Allowance dated Apr. 24, 2023 for CN Application No. 202110190693, 4 page(s).
English Translation of CN Notice of Allowance, including Search Report dated Apr. 24, 2023 for CN Application No. 202110190693, 3 page(s).

* cited by examiner

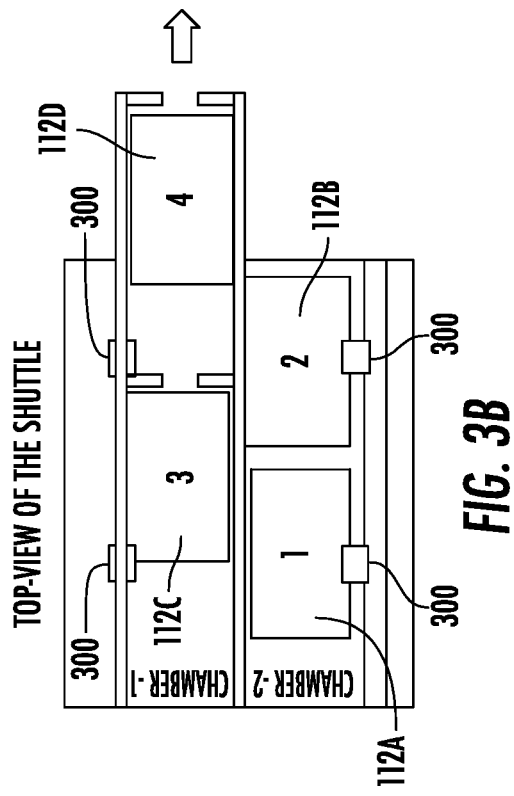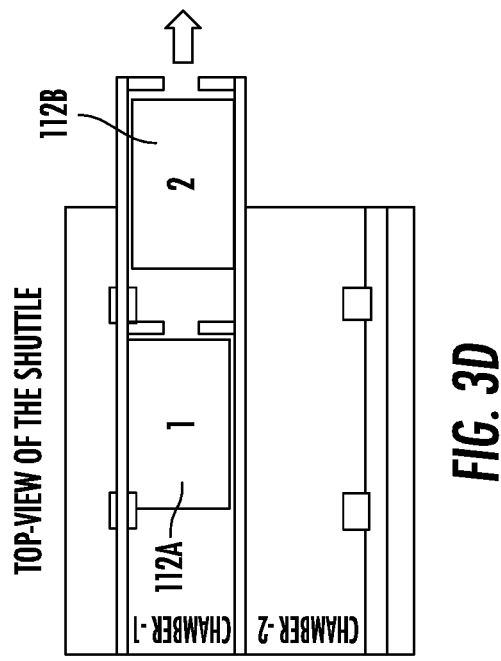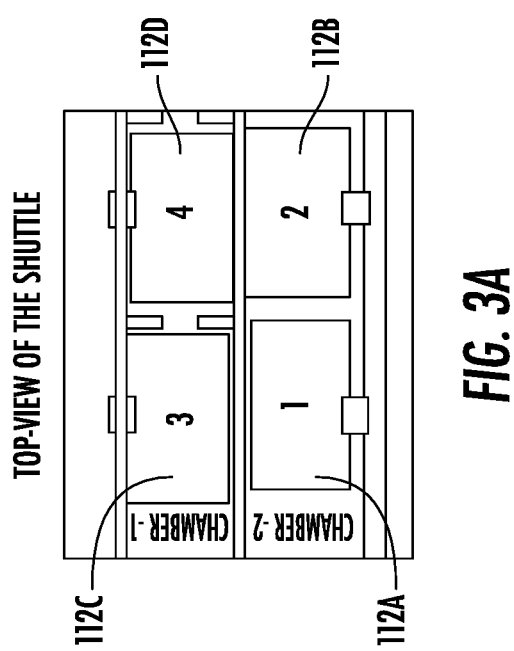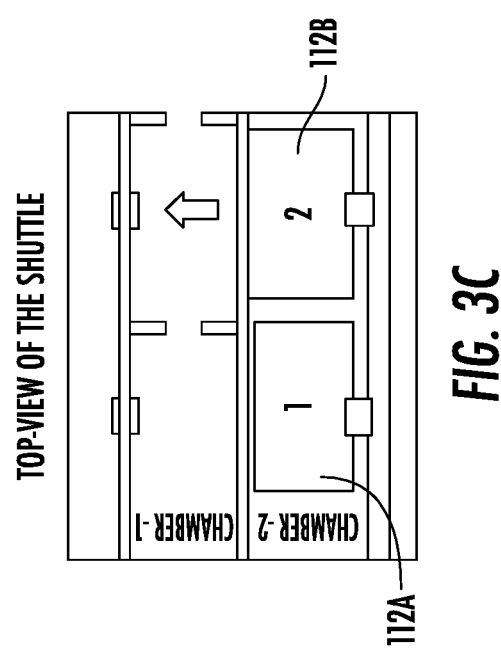

AUTOMATED SHUTTLE SYSTEMS FOR MULTI-DEPTH STORAGE RACKS

CROSS-REFERENCE TO RELATED APPLICATIONS

This application claims priority pursuant to 35 U.S.C. 119(a) of India Patent Application No. 202011011218, filed Mar. 16, 2020, which application is incorporated herein by reference in its entirety.

FIELD

The present disclosure relates generally to material handling of containers, packages, discrete articles and/or other objects, and more specifically to techniques for moving objects stored at various depths of a storage rack via a shuttle.

BACKGROUND

Automated shuttles moving along integrated tracks within storage racks are configured for the retrieval of objects stored at discrete storage locations within those storage racks. In an effort to maximize the amount of storage space usable within a footprint defined by the storage racks and the automated shuttle system, the overall size of the shuttle has generally approximated the size of a single object (e.g., the estimated largest object) to be stored and retrieved within the overall system, while storage racks have been provided with multiple-depth storage locations, such that objects may be stored one behind another. However, due to the configuration of the automated shuttles, retrieval of an object from a second depth within a storage rack (e.g., behind at least one other object at a first depth), the automated shuttles have been required to move the object from the first depth into an open reserve storage location before the object in the storage location at the second depth may be retrieved. Through applied effort, ingenuity, and innovation, many of these identified problems have been solved by the methods and apparatus of the present disclosure.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In an example embodiment, a method is provided for retrieving an object from a multi-depth object storage. The method includes retrieving, via a shuttle, at least a first object from a first depth of a storage location and a second object from a second depth of the storage location. The first depth is less than the second depth, such that the first object positioned at the first depth interferes with retrieval of the second object positioned at the second depth. The method also includes manipulating the first object and the second object, such that the first object is positioned to be disposed into the storage location while the second object remains disposed on the shuttle. The method further includes disposing the first object into the storage location while the second object remains on the shuttle.

In some embodiments, the shuttle defines an object load bed. In such an embodiment, the object load bed is configured to hold the first object and the second object upon retrieval from the storage location. In some embodiments, the shuttle includes at least a first shuttle load arm and a second shuttle load arm configured along the sides of the object load bed. In such an embodiment, each of the shuttle load arms define one or more fingers configured to engage with the given object during operation. In some embodiments, the object load bed defines a first chamber and a second chamber. In such an embodiment, the first chamber and the second chamber are each configured to support at least one object therein.

In some embodiments, the shuttle defines a third load arm that is at least substantially centrally located relative to the width of the object load bed. In some embodiments, the third arm is centrally located and configured to work with the first load arm and second load arm. In some embodiments, the shuttle defines a third load arm that is at least substantially centrally located relative to the width of the object load bed and a fourth load arm positioned adjacent to the third load arm that is at least substantially centrally located relative to the width of the object load bed. In such an embodiment, the third load arm includes one or more arm fingers configured to engage with objects in the first chamber and the fourth load arm includes one or more arm fingers configured to engage with objects in the second chamber. In some embodiments, the third arm finger(s) may be configured to work with at least one of the first load arm finger(s) and/or the second arm finger(s) (e.g., engage objects in coordination with at least one of the first load arm finger(s) and/or the second arm finger(s)). In such embodiments, the third arm finger(s) may be configured to selectively engage with an object between the third arm and the first arm and/or the third arm finger(s) may be configured to selectively engage with an object between the third arm and the fourth arm. In some embodiments, the third arm finger(s) may be capable of retracting and the extending towards at least one of the first arms or the second arms (e.g., extend into one or both chambers of the shuttle). For example, the third arm finger(s) may be capable of extending on either side of the third arm. In some embodiments, each individual third arm finger may only be capable of extending towards one of the first arm or the second arm. For example, the third arm may have one or more fingers dedicated to working with the first arm (e.g., extending towards the first arm) and also one or more fingers dedicated to working with the second arm (e.g., extending towards the second arm). In some embodiments, the third arm may be configured with independent fingers configured to work with one of the first arm finger(s) or the second arm finger(s). In some embodiments, the third load arm may be configured to work in conjunction with the first load arm and the fourth load arm may be configured to work with the second load arm.

In some embodiments, the third load arm and/or fourth load arm separates the first chamber and the second chamber and retrieving the first object and the second object from the storage location includes retrieving the first object via at least one integrated finger of the first load arm and one of one or more integrated fingers of the third load arm such that the first object is disposed in the first chamber of the object load bed; moving the shuttle, such that the second chamber is aligned with the storage location; and retrieving the second object via at least one integrated finger of the second load arm and one of the one or more integrated fingers of the third load arm such that the second object is disposed in the second chamber of the object load bed.

In some embodiments, manipulating the first object and the second object includes moving the second object into the second chamber in an instance the first object is disposed in the first chamber. In such an embodiment, the first chamber is aligned with the storage location, such that the first object may be disposed into the storage location. In some embodiments, the method also includes moving the second object into the first chamber in an instance in which the first object has been disposed into the storage location. In some embodiments, the first chamber is configured to support at least two objects simultaneously and the second chamber is configured to support at least two objects simultaneously, such that the load bed is configured to support at least four objects simultaneously.

In some embodiments, the object load bed includes a lifting mechanism to move the given object in a first direction during operation. In such embodiment, the manipulating the first object and the second object includes moving the second object in the first direction, via the lifting mechanism, such that the first object may be disposed into the storage location, wherein the first direction is defined in a vertical or horizontal direction. In some embodiments, the manipulating the first object and the second object comprises rotating the object load bed of the shuttle at least approximately 180 degrees such that the first object may be disposed into the storage location while the second object remains on the shuttle. In some embodiments, manipulating the first object and the second object further includes rotating the first object on the object load bed (e.g., approximately 180 degrees relative to the original orientation). In some embodiments, the method also includes rotating the object load bed at least approximately 180 degrees after placing the first object in the storage location.

In another example embodiment, a shuttle configured for retrieving an object from a multi-depth object storage is provided. The shuttle includes an object load bed configured to hold at least a first object and a second object upon retrieval from a storage location and a plurality of load arms, each load arm with at least one finger. The shuttle is configured to retrieve at least the first object from a first depth and the second object from a second depth of the storage location with the first depth less than the second depth, such that the first object positioned at the first depth interferes with retrieval of the second object positioned at the second depth. The shuttle is also configured to manipulate the first object and the second object, such that the first object is positioned to be disposed into the storage location while the second object remains disposed on the shuttle. The shuttle is further configured to dispose the first object into the storage location while the second object remains on the shuttle.

In some embodiments, the shuttle includes at least a first shuttle load arm and a second shuttle load arm configured along the sides of the object load bed. In such an embodiment, each of the shuttle load arms define one or more fingers configured to engage with the given object during operation. In some embodiments, the object load bed defines a first chamber and a second chamber. In such an embodiment, the first chamber and the second chamber are each configured to support at least one object therein. In some embodiments, the shuttle also includes a third load arm that is at least substantially centrally located relative to the width of the object load bed.

In some embodiments, the shuttle defines a third load arm that is at least substantially centrally located relative to the width of the object load bed and a fourth load arm positioned adjacent to the third load arm that is at least substantially centrally located relative to the width of the object load bed. In such an embodiment, the third load arm includes one or more arm fingers configured to engage with objects in the first chamber and the fourth load arm includes one or more arm fingers configured to engage with objects in the second chamber. In some embodiments, the third load arm separates the first chamber and the second chamber and retrieving the first object and the second object from the storage location further includes retrieving the first object via at least one integrated finger of the first load arm and one of one or more integrated fingers of the third load arm such that the first object is disposed in the first chamber of the object load bed; moving the shuttle, such that the second chamber is aligned with the storage location; and retrieving the second object via at least one integrated finger of the second load arm and one of the one or more integrated fingers of the third load arm such that the second object is disposed in the second chamber of the object load bed.

In some embodiments, manipulating the first object and the second object includes moving the second object into the second chamber in an instance the first object is disposed in the first chamber. In such an embodiment, the first chamber is aligned with the storage location, such that the first object may be disposed into the storage location. In some embodiments, the first chamber is configured to support at least two objects simultaneously and the second chamber is configured to support at least two objects simultaneously, and wherein the load bed is configured to support at least four objects simultaneously.

In some embodiments, the shuttle is further configured to move the second object into the first chamber in an instance in which the first object has been disposed into the storage location. In some embodiments, the object load bed includes a lifting mechanism to move the given object in a first direction during operation. In such an embodiment, the manipulating the first object and the second object includes moving the second object in the first direction, via the lifting mechanism, such that the first object may be disposed into the storage location with the first direction being defined in a vertical or horizontal direction.

In some embodiments, the manipulating the first object and the second object includes rotating the object load bed of the shuttle approximately 180 degrees such that the first object may be disposed into the storage location in an instance the second object remains on the shuttle. In some embodiments, manipulating the first object and the second object further comprises rotating the first object on the object load bed. In some embodiments, the shuttle is further configured to, after placing the first object in the storage location, rotate the object load bed at least approximately 180 degrees.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIGS. 3A-3D illustrate the movement of objects on a shuttle in accordance with an example embodiment;

FIG. 3I is a flowchart of disposal operations of a shuttle in accordance with an example embodiment, such as the shuttle shown in FIGS. 3E-3G or FIGS. 4A-4C FIGS. 4A-4E illustrate the movement of objects on a shuttle in accordance with another example embodiment;

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1A:
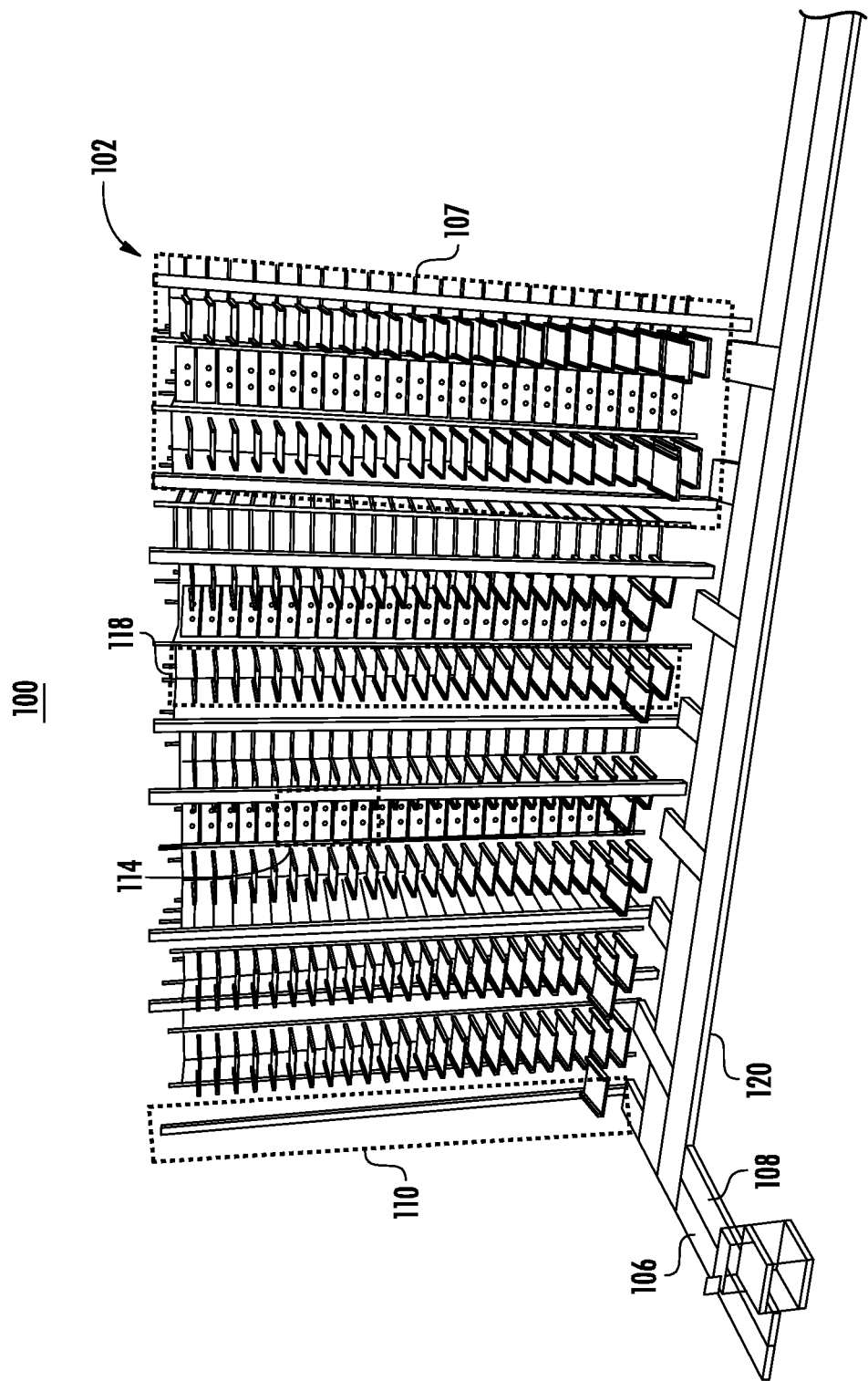
FIG. 1A illustrates a perspective view of a material handling system that includes an automated storage and retrieval system (AS/RS) utilizing dual carriage lifts, according to one or more embodiments.

FIG. 1A illustrates a material handling system 100 that includes an automated storage and retrieval system (AS/RS) 102. A storage rack 104 of the AS/RS 102 may be defined as a series of vertically arranged shelves, each supported by a support frame (e.g., a post and beam rack discussed in reference to FIG. 1B). The support frame may comprise vertical support members separating various levels within the storage rack 104, and horizontal support members supporting individual shelves. Each shelf may define and/or comprise one or more bay, each bay may encompass a plurality of storage locations configured for storing at least one object (e.g., a storage container, a product, a spool, and/or other object configurations) therein. The AS/RS may define one or more aisles 107 defined between two adjacent storage racks with one or more shuttles 114 defined therein to remove and/or place objects into storage locations within the storage rack. As shown, the objects may be moved between different levels via lifts 110 and/or to and from pick-up and drop-off stations 118. In an example embodiment, the objects may be received by the system at pick-up and drop-off stations 118 from the in-feed conveyor 106 via the product delivery system 120 and the lift interface 122. In various embodiments, the objects may be removed from the AS/RS via pick-up and drop-off stations 118, which pass the object to the product delivery system 120, then the lift interface 122, and finally to the out-bound conveyor 108.

Each storage location may be defined as a physical space on a shelf where an object is stored. In various embodiments, as discussed herein the storage location may define a storage depth capable of holding one or more objects (e.g., multiple objects at various depths). Various shelves may have various configurations with storage locations having different sizes and/or depths based on the given configuration (e.g., the size and shape of a given object). In various embodiments, a bay may be defined between vertical support members of the storage rack, such that multiple storage locations may be defined within a given bay.

Figure 1B:
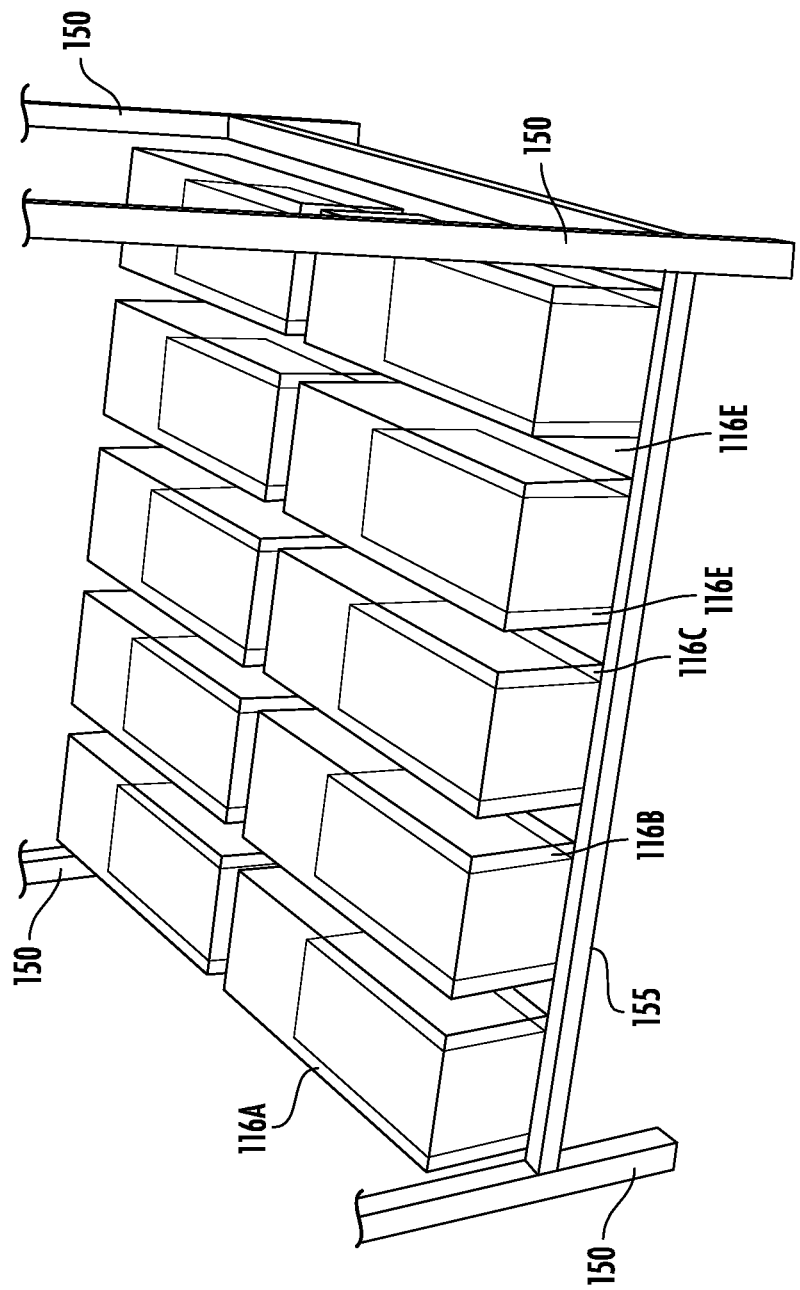
FIG. 1B illustrates a perspective view of a storage rack for use in an AS/RS in accordance with certain embodiments.

As discussed herein, one or more horizontal support members within each level may comprise or define at least a portion of a movement track for a shuttle as discussed herein. In various embodiments, the storage rack 104 may be a post and beam rack configured with four vertical support members 150 (e.g., upright posts) at the corners of a rectangle with the horizontal support members 155 (e.g., load beams) connecting said vertical posts. FIG. 1B illustrates an example shelf defined with four vertical support members 150 with horizontal support members 155 extending between and connecting said vertical support members. In various embodiments, such as for carton-based systems, a variety of surfaces are used to span the distance between the horizontal support members to form a shelf. In some embodiments, a solid shelf may be used in an instance in which steel fire blocks are placed on levels creating a sprinkler configuration. Other examples for bearing surfaces for carton or tote based systems include wire mesh, ledger boards, and the like. For example, in an instance in which wire mesh is used, the top wire (the contact surface) may run parallel to the direction of load handler action, such that the chances of loads catching or hanging up while being manipulated with the load handler are minimized. In various embodiments, the width of the standard shelf may be based on the dimensions of a typical storage pattern. For example, the standard shelf width may be approximately 8 feet.

In various embodiments, as shown in FIG. 1A, the storage rack 104 is provided with objects via in-feed conveyors 106 for storage. In various embodiments, the storage rack 104 may define multiple levels connected via vertical lifts 110 configured to move objects between the in-feed and out-feed conveyors 106, 108 to an appropriate level of the storage rack 104. The vertical lifts 110 have a vertical support structure positioned proximate to the storage rack 104 to pick up and to deposit objects at selected levels within the storage rack 104. The vertical lifts 110 may be secured to the racks and transport objects between conveyors defined on different levels. Each level of a storage rack 104 may be divided into storage locations (e.g., storage location 116) configured to house one or more objects 112. In various embodiments, an object may be any type of container used in an AS/RS, such as a carton, a case, a tote, a divided tote, a tray, a pallet, or the like.

In various embodiments, each storage location may be defined between the cross members for a given level. In various embodiments, one or more storage locations may define a storage location opening configured to receive an object therein. Alternatively, each storage location may be defined as a section of a given rack level that is as wide as the object to be received. The one or more storage locations may define a storage location depth configured to house at least one object. In an instance in which the storage location defines a sufficient depth for multiple objects, the objects may be disposed into the storage locations such at varying depths (e.g., the last object placed in the storage location may block any other objects in the storage location from being removed from said storage location).

Figure 1C:
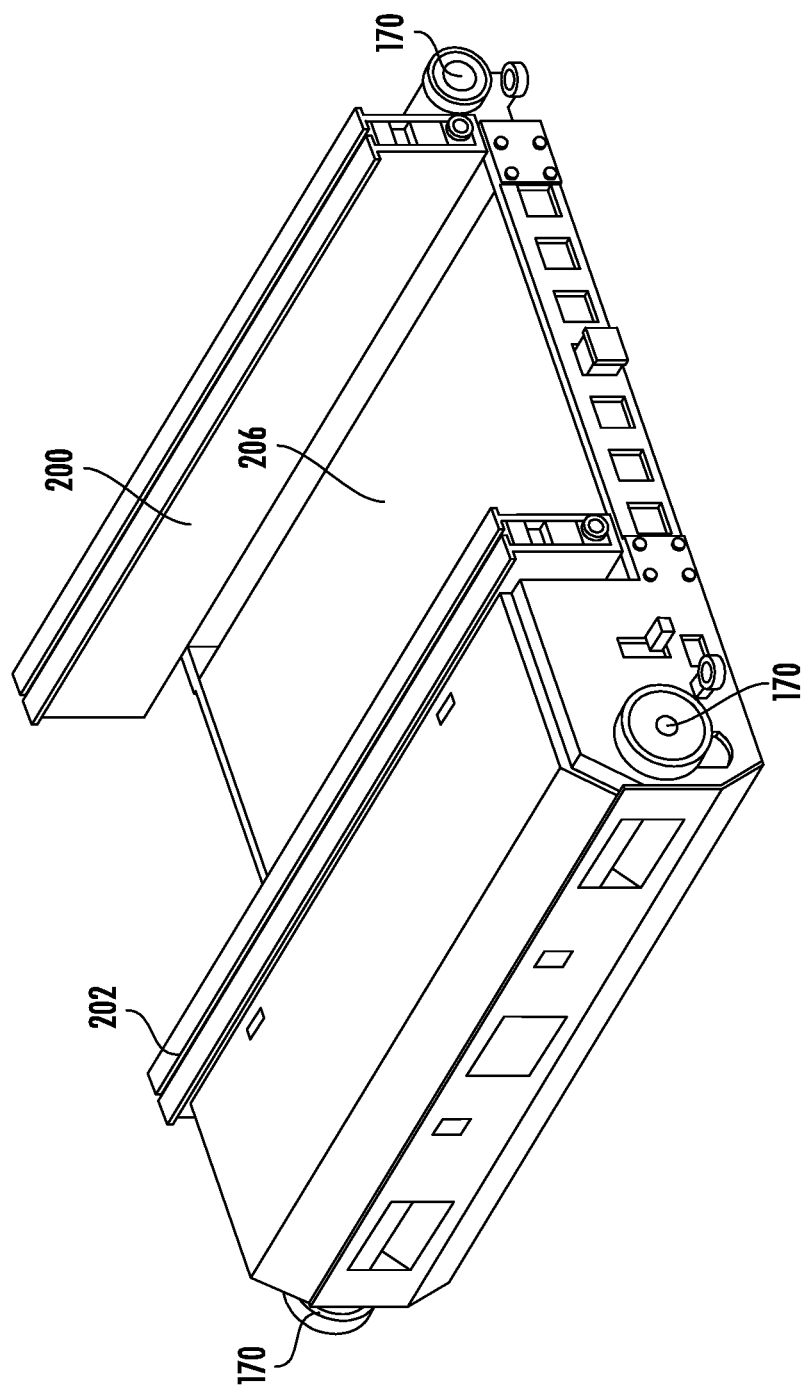
FIG. 1C illustrates a perspective view of a shuttle in accordance with certain embodiments.

In order to remove and/or place objects into various storage locations of the storage rack 104, the material handling system 100 may use a shuttle 114 configured to retrieve one or more objects from the storage rack 104. An example shuttle is shown in FIG. 1C. In various embodiments, the shuttle 114 may be any type of one-level shuttle (OLS) vehicle typically used in a AS/RS, such as a shuttle, a carrier, a bot, and/or the like. In various embodiment, the shuttle 114 may be a self-contained unit, receiving power (e.g., 48 VDC) from a bus bar located inside the shuttle guide track that may be mounted to the storage rack. In various embodiments, the power guide track (e.g., 48 VDC power supplied to the track) may be powered from a DC power panel. In various embodiments, a single DC power panel can power a plurality of shuttles (e.g., up to six shuttles). In various embodiments, the shuttle 114 may receive control system commands over a Wireless Local Area Network (WLAN). In various embodiments, at least one shuttle 114 may be disposed along each level of the storage rack 104. As such, the shuttle(s) 114 may be configured to move in the horizontal direction along the storage rack via a shuttle guide track. For example, the shuttle may have one or more wheels 170, as shown in FIG. 1C to move alone the shuttle track via a motor. In various embodiments, one or more shuttles 114 may be configured to move between various levels of the AS/RS via one of the vertical lifts 110. In various embodiments, the shuttle track may be affixed to the storage rack. However, it should be understood that any of a variety of movement mechanisms may be utilized for moving the shuttle (e.g., belt-drive systems, magnetic movement mechanisms, chain-drive systems, and/or the like). Moreover, it should be understood that the movement mechanisms may be defined within the shuttle (e.g., a motor positioned on the shuttle) or within the storage rack (e.g., motors within the storage rack). The shuttle(s) may be configured with sensors configured move to an intended storage location and/or engage with an object in a given storage location. For example, the shuttle 114 may be equipped with a proximity sensor to determine the location of the shuttle along the horizontal direction or to determine the depth of a given object within a storage location. In various embodiments, the shuttle 114 may also be equipped with sensors and onboard devices, such as Wi-Fi antenna for communication with a Warehouse Control System (WCS), overload protection, one or more power supplies (e.g., 24 Volt power supply and/or 48 volt power supply), digital input and output modules, and/or the like. As discussed in more detail below, the shuttle(s) 114 may include one or more load arms configured to extend into a storage location. In some embodiments, the shuttle may have a first load arm and a second load arm defined along opposite side walls of the shuttle. The side walls may be configured to resist motion of an object during movement of the shuttle. In various embodiments, one or more of the integrated arm fingers may be used to hold an object during the loading and/or unloading process. The shuttle may define an object load bed 206 (shown in at least FIG. 2A, for example) defined between the two opposing side walls. The object load bed defines a floor configured to support the object(s) during movement, as shown in FIG. 1B. Each load arm may have one or more retractable fingers configured to engage an object and move said object onto or off of the shuttle. In some embodiments, the shuttle 114 may be disposed between two storage racks 104, such that the shuttle may retrieve one or more objects in any storage location of the two storage racks 104 along a given level (e.g., the load arm(s) of a shuttle may extend towards either of the two storage racks 104). For example, two adjacent storage racks may be separated sufficiently to allow the shuttle to move therebetween. Upon retrieval of the object(s), the shuttle 114 is configured to carry said object(s) to another storage location or to a conveyor configured to transport the object to one of the vertical lift (e.g., an inbound or outbound spur). As such, the shuttle may move the desired object to one of the vertical lifts 110, which may move the object to an out-feed conveyor 108. The vertical lifts 110 may move be capable of moving objects between different levels of the storage racks.

FIG. 1B illustrates an example storage rack 104 configuration in which each storage location is capable of holding at least two objects 112A, 112B. In such an embodiment, the first object 112A, which defines a first depth shorter than the second depth defined by the second object 112B defined in the same storage location. As such, the second object 112B cannot be removed from the storage location via the shuttle without the shuttle first removing the first object 112A. Traditional shuttles are configured such that the first object must be either carried along with the second object 112B or be moved to another "reserved" storage location on the storage rack 104 (e.g., a different storage location within a bay or a different storage location in a different bay). As such, the storage rack 104 requires additional movement of the shuttle and/or additional storage space on the rack. Various embodiments of the present disclosure as discussed herein allow for the first object 112A to be moved back into the same storage location 116 in the same bay, while the second object 112B remains on the shuttle.

Figure 2A:
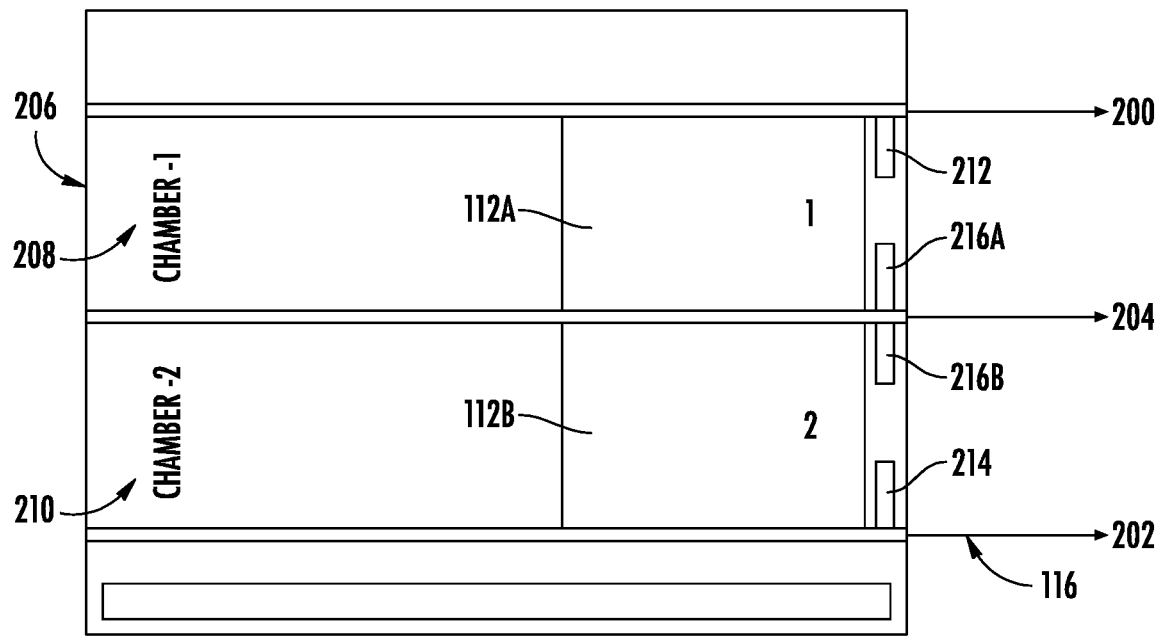
FIGS. 2A-2B illustrate a top view (FIG. 2A) and a side view (FIG. 2B), respectively, of a shuttle design of an example embodiment.
Figure 2B:
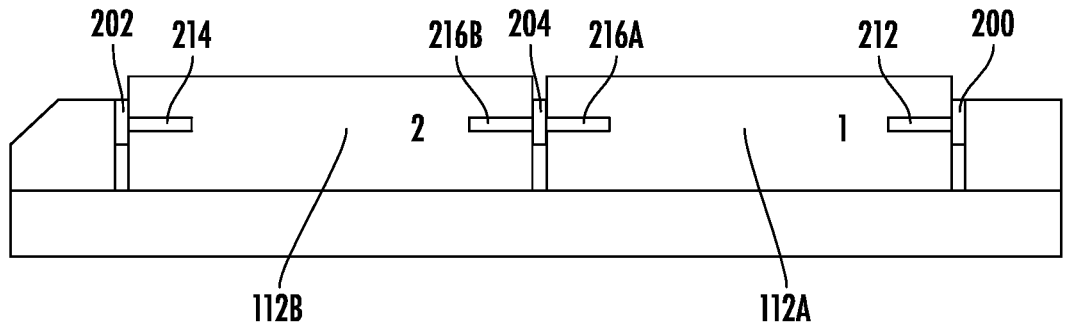

In various embodiments, shuttles 114 discussed herein may define an object load bed 206 configured to hold at least the first object and the second object upon retrieval from the storage location. In various embodiments, the shuttle 114 may define a first load arm 200 and a second load arm 202 defined on opposite sides of the object load bed 206. FIGS. 2A and 2B illustrate a shuttle of an example embodiment that defines a width that is at least as wide as the width of two objects (e.g., such that two objects may sit side by side on the shuttle). In some embodiments, the load bed 206 may have a depth of at least twice the depth of an object. In various embodiments, the shuttle 114 may include a third load arm 204 disposed between the first load arm 200 and the second load arm 202 on the object load bed 206. In various embodiments the third load arm 204 may be configured to engage with an object in both the first chamber 208 and the second chamber 210 (e.g., via the retractable load arm finger 216A (first chamber 208) and the retractable load arm finger 216B (second chamber 210). In various embodiments, a first chamber 208 may be defined between the first load arm 200 and the third load arm 204. In various embodiments, a second chamber 210 may be defined between the third load arm 204 and the second load arm 202. In various embodiments, each of the first chamber 208 and the second chamber 210 may be wide enough to dispose an object 110 therein. In various embodiments, the load arms 200-204 may be extendable, such that they enter a given storage location and retrieve the given object via one or more integrated fingers.

In some embodiments, the third arm finger(s) may be configured to work with at least one of the first load arm finger(s) and/or the second arm finger(s) (e.g., engage objects in coordination with at least one of the first load arm finger(s) and/or the second arm finger(s)). In such embodiments, the third arm finger(s) may be configured to selectively engage with an object between the third arm and the first arm and/or the third arm finger(s) may be configured to selectively engage with an object between the third arm and the fourth arm. In some embodiments, the third arm finger(s) may be capable of retracting and the extending towards at least one of the first arms or the second arms (e.g., extend into one or both chambers of the shuttle). For example, the third arm finger(s) may be capable of extending on either side of the third arm. In some embodiments, each individual third arm finger may only be capable of extending towards one of the first arm or the second arm. For example, the third arm may have one or more integrated fingers dedicated to working with the first arm (e.g., extending towards the first arm) and also one or more integrated fingers dedicated to working with the second arm (e.g., extending towards the second arm). In some embodiments, the third arm may be configured with independent fingers configured to work with one of the first arm finger(s) or the second arm finger(s). In an example embodiment, the first load arm 200 may have one or more first load arm fingers 212 and the third load arm 204 may have one or more third load arm fingers 216A that may be extended into the first chamber and be configured to engage with an object to move the given object from the storage location of the storage rack into the first chamber 208 of the object load bed 206 of the shuttle. Additionally, the second load arm 202 may have a second load arm finger 214 and the third load arm may have a third load arm finger 216B that may extend into the second chamber and be configured to engage with an object to move the given object from the storage location of the storage rack 104 into the second chamber 210 of the object load bed 206 of the shuttle. In some embodiments, a fourth load arm 207 may be provided, as shown in FIG. 2C adjacent to the third arm 204, such that the third arm may only have retractable, integrated fingers that interact with the first chamber, while the fourth arm may have retractable, integrated fingers that interact with the second chamber.

Figure 2C:
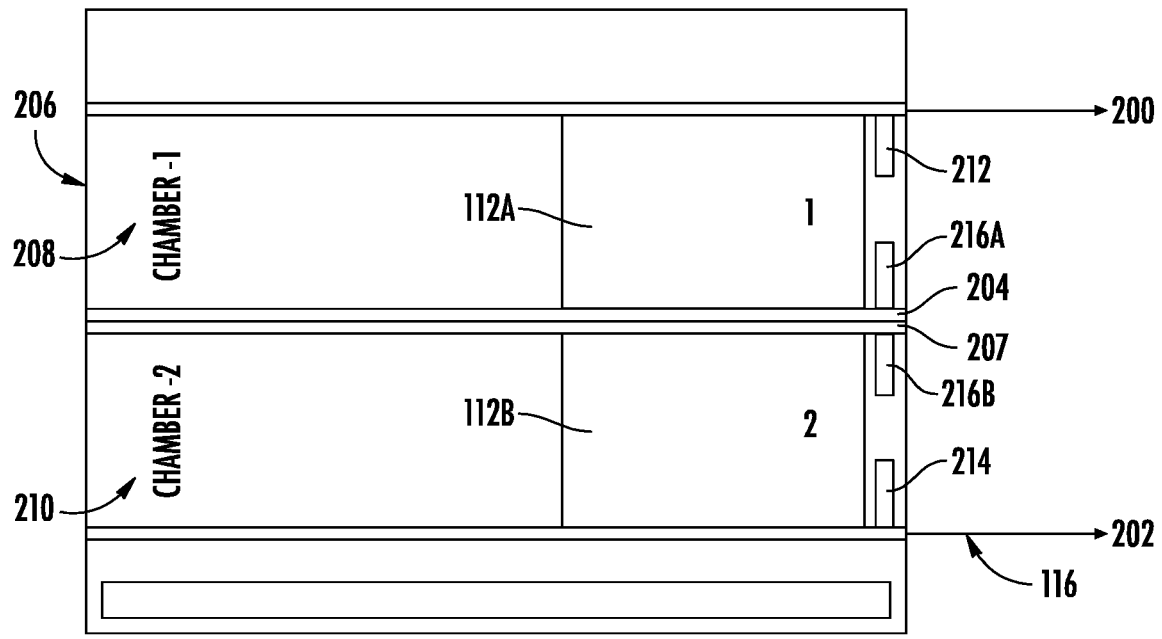
FIG. 2C is a top view of a shuttle design of an example embodiment having four load arms.
Figure 2D:
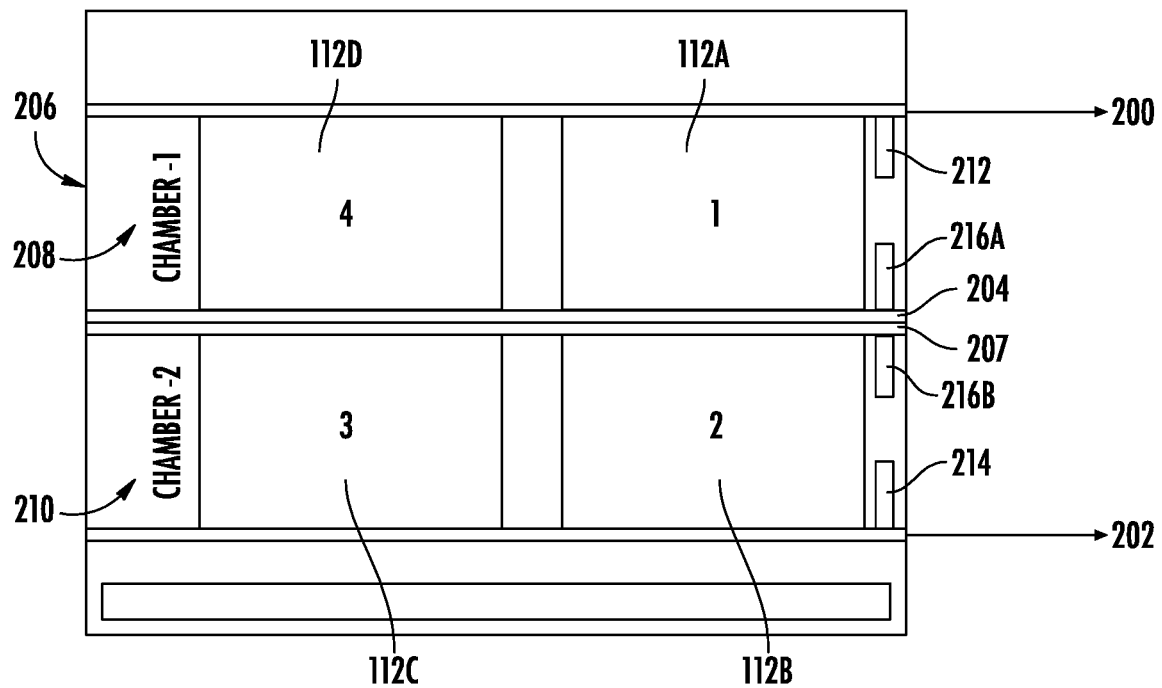
FIG. 2D illustrates another top view of a shuttle having four load arms, such as the shuttle design shown in FIG. 2C, loaded with four object in accordance with certain embodiments.

In various embodiments, as shown in FIG. 2D, a shuttle in accordance with FIGS. 2A-2C may be capable of increased capacity over modern shuttles. In various embodiments, as shown, the shuttle may be capable of holding four total objects (e.g., two objects in each of the chambers). In various embodiments, the shuttle may be capable of holding four objects in an instance in which three or four arms are provided (e.g., in an instance in which the width of the shuttle is sufficient to hold multiple objects). In various embodiments, the plurality of objects may be moved and/or stored in different storage locations based on the storage needs of the system. In various embodiments, a shuttle of an example embodiment using the same design may be capable of housing additional objects (e.g., the shuttle may be extended to house three objects in each chamber).

Figure 2E:
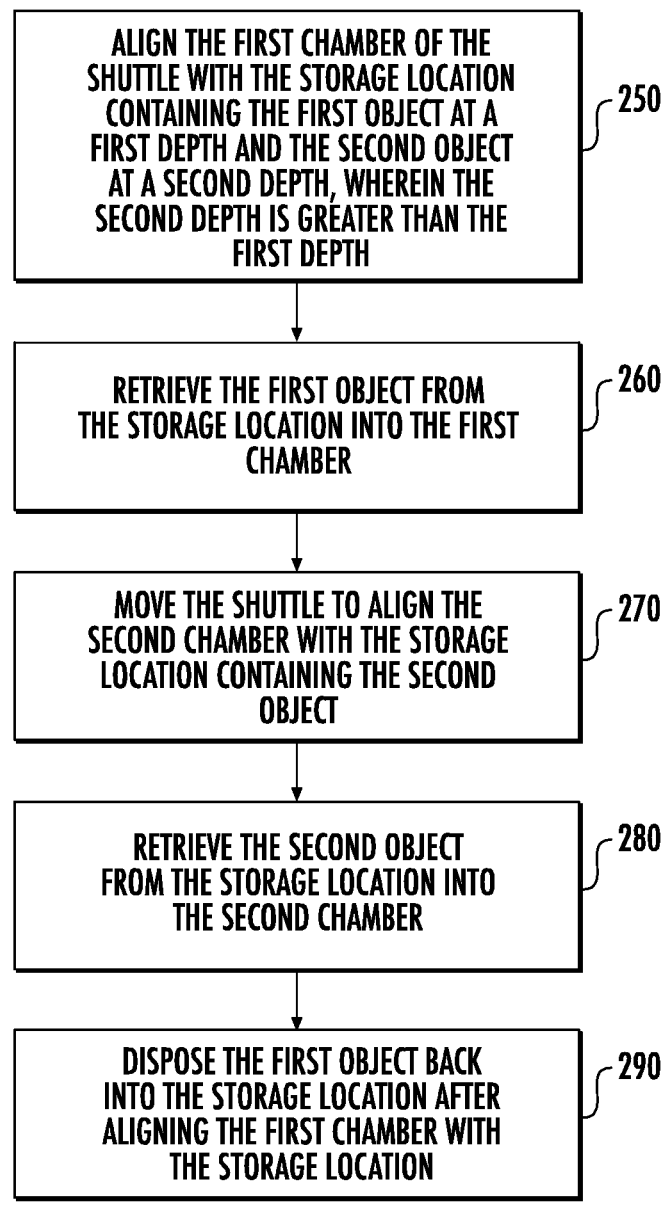
FIG. 2E is a flowchart of retrieval operations of a shuttle in accordance with an example embodiment, such as the shuttle shown in FIGS. 2A-2C.

FIG. 2E is a flowchart of the retrieval operations of shuttle, such as the one shown in FIGS. 2A-2C, in accordance with various embodiments. While the operations discussed herein may be discussed in reference to removing objects from a storage location, the various operations may also be used to dispose objects into the storage location at various depths (e.g., in an instance in which the first object and the second object are being disposed into the storage location, the load bed may be manipulated such that the second object may be placed into the storage location before the first object, such as discussed in reference to FIG. 2E). For example, in an instance the first object 112A and the second object 112B are both inbound (e.g., from the inbound conveyor) and the second object 112B is desired to be at a second depth greater than the first depth of the first object 112A, the first object 112A may be moved (e.g., using various operations discussed herein) to allow the second object 112B to be disposed into a storage location before the first object 112A is disposed into the same storage location. Various embodiments of the present disclosure may be capable of increased object capacity over current shuttle designs. For example, the shuttles of FIGS. 2A-2C and 3A-3D may each have capacity for up to four objects during a given instance (e.g., each chamber of FIG. 2A may have two objects).

Referring now to Block 250 and Block 260 of FIG. 2E, the method of retrieving the second object 112B may include aligning the first chamber of the shuttle with the storage location containing the first object at a first depth and the second object at a second depth, wherein the second depth is greater than the first depth, and then retrieving the first object from the storage location into the first chamber. As discussed above, the first load arm 200 and/or the third load arm 204 may have integrated fingers (e.g., fingers 212, 216A) configured to be retractable and to engage with the first object 112A to move the first object from the storage location into the first chamber 208.

Referring now to Block 270 and Block 280 of FIG. 2E, the method of retrieving the second object 112B may include moving the shuttle to align the second chamber with the storage location containing the second object, and then retrieving the second object 112B from the storage location into the second chamber 210.

Referring now to Block 290 of FIG. 2E, the method of retrieving the second object 112B may include disposing the first object back into the storage location from which the first object 112A was retrieved after aligning the first chamber with the storage location. In some embodiments, the first object 112A may be disposed back into the storage location before the second object 112B is taken to a nearby lift 110 in order to be taken to the out-feed conveyor 108. In various embodiments, once the second object 112B is retrieved (e.g., Block 280), the shuttle may move such that the first chamber of the shuttle is aligned with the storage location (e.g., as it was in the operations of the Block 250 and Block 260).

Figure 2F:
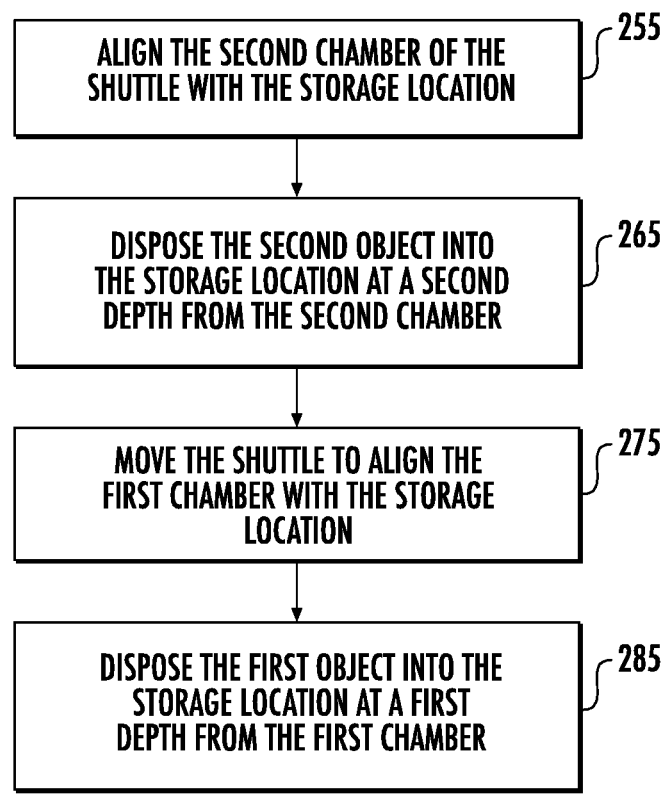
FIG. 2F is a flowchart of disposal operations of a shuttle in accordance with an example embodiment, such as the shuttle shown in FIGS. 2A-2C.

FIG. 2F is a flowchart of the disposal operations of a shuttle, such as that shown in FIGS. 2A-2C in accordance with various embodiments. Various embodiments may be configured for increased object capacity over current shuttle designs. For example, the shuttles of FIGS. 2A-2C and 3A-3D may each have capacity for supporting up to four objects during a given instance (e.g., each chamber of FIG. 2A may have two objects). Additionally, various embodiments of shuttles discussed herein may be used to shuffle one or more objects while also carrying additional objects that are not needed to be shuffled.

Referring now to Block 255 and 265 of FIG. 2F, the method of disposing the first object 112A at a first depth and the second object 112B at a second depth comprises aligning the second chamber 210 of the shuttle with the storage location, and then disposing the second object into the storage location from the second chamber. In various embodiments, the load arms (e.g., the second load arm 202 and either of the third load arm 204 or the fourth load arm 207) may be configured to engage with the second object 112B and move the second object 112B into the storage location to a second depth, such that another object may be placed into the storage location at a first depth less than the second object 112B.

Referring now to Block 275 and Block 285 of FIG. 2F, the method of disposing the first object 112A at a first depth and the second object 112B at a second depth includes moving the shuttle to align the first chamber with the storage location in which the second object was disposed, and then disposing the first object 112A into the storage location from the first chamber. In various embodiments, the load arms (e.g., the first load arm 200 and the third load arm 204) may be configured to engage with the first object 112A and move the first object 112A into the storage location at the first depth. In various embodiments, the first object 112A and the second object 112B may be stored in the opposite chambers, such that the second object 112B is in the first chamber and the first chamber is aligned with the storage location first.

FIGS. 3A-3D illustrates another example operation for a shuttle with a width defined as at least twice the width of an object. In some embodiments, the shuttle may have the first arm 200 disposed along the side of the load bed 206. In some embodiments, the second arm 202 may be centrally located in the middle of the load bed 206. For example, the second arm 202 may divide the load bed into two chambers and may be retractable, such that an object may be moved from one chamber to another. In various embodiments, the operations may be based on the disposal of the first object 112A, the second object 112B, the third object 112C, and the fourth object 112D into a singular storage location. Referring now to FIG. 3A, the shuttle 114 may be "fully loaded" such that the maximum number of objects are located on the load bed 206 (e.g., four objects 112A-112D) may be loaded onto the load bed 206. In various embodiments, the shuttle 114 may be configured to move to a specific storage location for which the objects are to be disposed. As shown in FIG. 3B, the fourth object 112D and the third object 112C disposed in the first chamber 208 may be disposed into the storage location via the shuttle arms. As shown in FIG. 3C, the first object 112A and the second object 112B may then be moved from the second chamber 210 into the first chamber 208 via one or more pushing mechanisms 400 (e.g., conveyor rollers may be employed to move the objects laterally). Additionally, in some embodiments, the shuttle itself may shift such that the second chamber aligns with the storage location in which the third object 112C and the fourth object 112D are disposed. As shown in FIG. 3D, the second object 112B, then the first object 112A may also be disposed into the storage location, such that the fourth object 112D defines a storage depth that is deeper than the third object 112C storage depth, which is deeper than the second object 112B storage depth, which is also deeper than the first object 112A storage depth. As such, for example, the first object 112A may have to be removed from the storage location before any other object may be accessed.

Figure 3E:
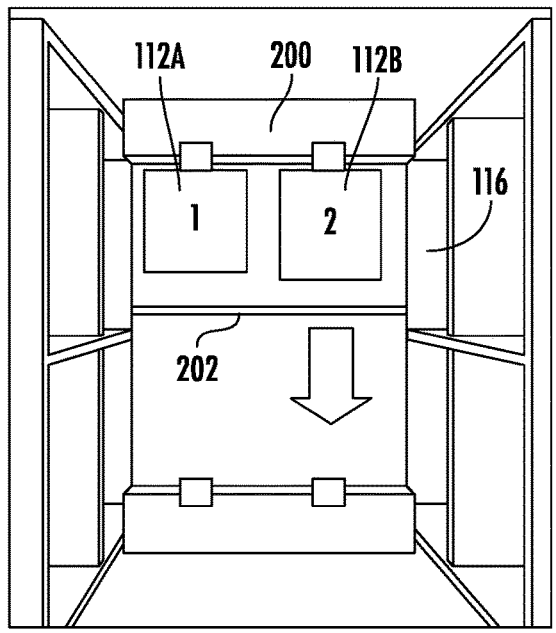
FIGS. 3E-3G illustrate the movement of objects on a shuttle in accordance with an example embodiment.
Figure 3F:
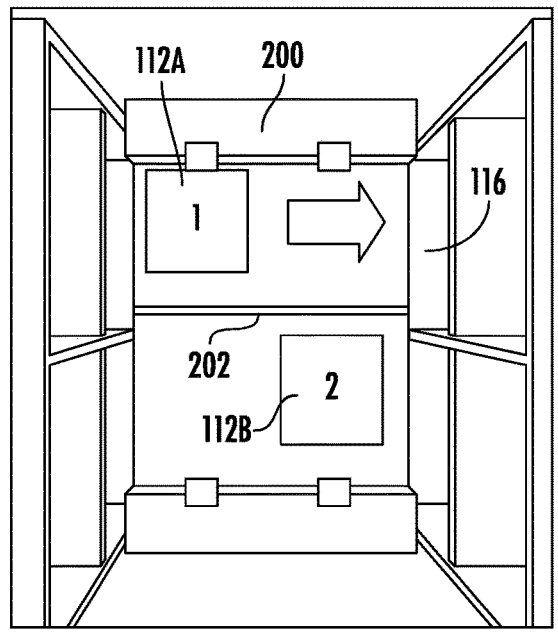
Figure 3G:
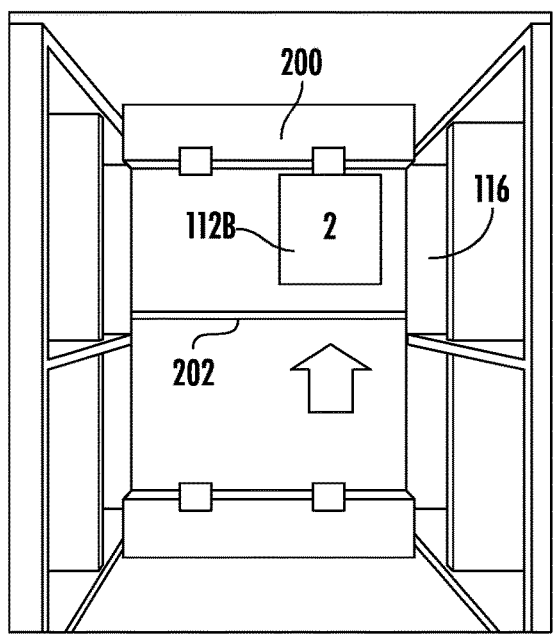

FIGS. 3E-3G illustrate a shuttle of an example embodiment that defines a width that is at least as wide as the width of two objects. In various embodiments, the shuttle may define a first load arm 200 and a second load arm 202. In various embodiments, the first load arm 200 may be disposed at a side of the load bed 206 and the second load arm 202 may be disposed at approximately the middle of the load bed. As such, the second load arm 202 may be configured to collapse (e.g., into a slot of the load bed) to enable the objects to move from one chamber of the object load bed 206 to another. In various embodiments, the shuttle may be configured with one or more moving mechanisms (e.g., a pushing mechanism or lifting mechanism) configured to move an object from one chamber to another. For example, the moving mechanism may be a hydraulic press, a motorized operation, a conveyor roller, and/or the like. In various embodiments, the moving mechanism may be defined along the edge of the load bed (e.g., as shown in FIG. 3A, one or more moving mechanisms 300, such as four, may be defined on a shuttle to move objects from one portion of the shuttle to another (e.g., laterally)). Additionally, in some embodiments, as shown in FIG. 4B, the moving mechanism (e.g., lifting mechanism 400) may be positioned exterior to the load bed. For example, the moving mechanism may be adjacent to the load area on the shuttle in operable communication with the method of movement used (e.g., a motor and/or hydraulics may be in communication with a portion of the load bed to move the given object).

Figure 3H:
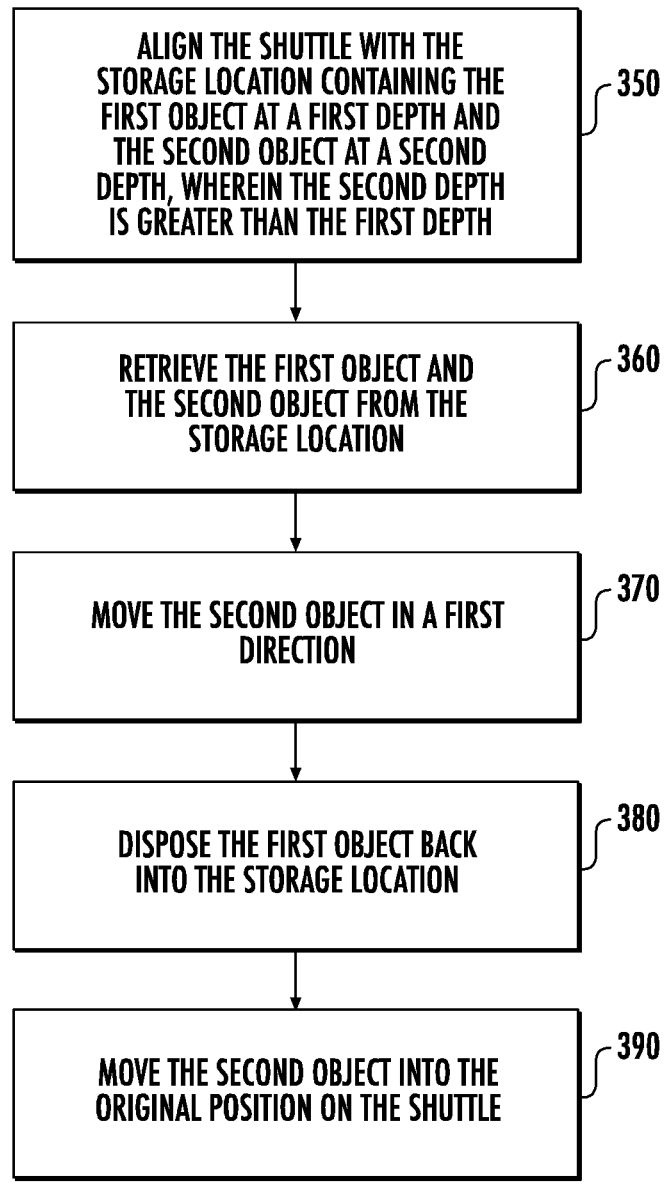
FIG. 3H is a flowchart of retrieval operations of a shuttle in accordance with an example embodiment, such as the shuttle shown in FIGS. 3E-3G or FIGS. 4A-4C.
Figure 31:
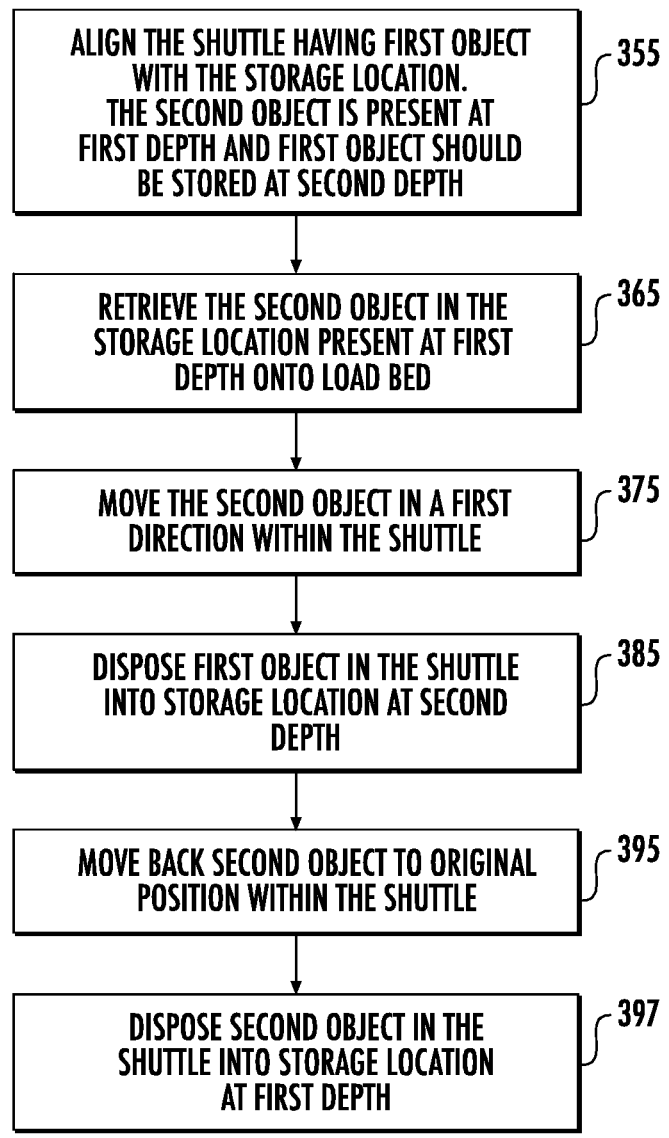

FIG. 3H is a flowchart that illustrates the retrieval operations of shuttle, such as the one shown in FIGS. 3E-3G, in accordance with various embodiments. Referring now to Block 350 of FIG. 3H, the method of retrieving the second object 112B includes aligning the shuttle with the storage location containing the first object 112A and the second object 112B. In various embodiments, aligning of the shuttle may comprise aligning the storage location with the first load arm 200 and the second load arm 202, such that the first load arm 200 and the second load arm 202 may extended into the storage location without contacting the objects (e.g., the load arm 200 or 202 may extend into the storage location and then extend one or more fingers to engage with an object to bring the object(s) onto/the shuttle). Referring now to Block 360 of FIG. 3H, the method of retrieving the second object 112B includes retrieving the first object 112A and the second object 112B from the storage location. In some embodiments, the first object 112A and the second object 112B may be retrieved via a single motion of the given load arm (e.g., the load arm may engage with the second object 112 and move it towards the first object 112A causing both objects to move to the shuttle. Alternatively, each object may be moved onto the shuttle individually (e.g., the first object 112A may be moved onto the shuttle, then the second object 112B may be moved onto the shuttle). FIG. 3E illustrates example operations in which the first load arm 200 is aligned with the storage location and the first object 112A and the second objects 112B have been loaded onto the shuttle. As shown in Block 370 of FIG. 3H and illustrated in FIG. 3F, the second object 112B may be moved in a first direction such that the pathway from the first object to the same storage location is unobstructed. In various embodiments, the first direction may be vertical (e.g., up or down as shown in FIGS. 4A-4E) or horizontal (e.g., as shown in FIGS. 3E-3G). As such, as shown in Block 380 of FIG. 3H, the first object 112A may be disposed back into the same storage location. Additionally, as shown in Block 390 of FIG. 3H and also illustrated in FIG. 3G, the second object 112B may be moved back into the original position within the load bed (e.g., the second object may be moved in a second direction that is the opposite of the first direction). In various embodiments, the shuttle then may move the second object 112B towards the vertical lift 110 and ultimately towards the out-feed conveyor 108.

FIG. 3I is a flowchart that illustrates the disposal operations of shuttle, such as the one shown in FIGS. 3E-3G, in accordance with various embodiments. The operations discussed herein may occur in an instance in which the first object 112A is located on the load bed between the second object 112B and the storage location and the second object 112B is to be disposed within the storage location behind the first object 112A. Referring now to Block 355 of FIG. 3I, the method of disposing the first object and the second object into a storage location includes aligning the shuttle with the storage location, as discussed in reference to Block 350 above. In such an embodiments, the first object may be disposed on the shuttle and the second object is disposed within the storage location at a first depth. For example, the first object 112A may be stored within the storage location at the second depth (e.g., behind the second object 112B). In such an example, as shown in Block 365, the method of disposing the first object and the second object into a storage location includes retrieving the second object in the storage location at the first depth onto the load bed 206. In various embodiments, the retrieval of the second object 112B may be as discussed above (e.g., Block 360 of FIG. 3H). Referring now to Block 375 of FIG. 3I, the method of disposing the first object and the second object into a storage location includes moving the second object 112B in a first direction. In various embodiments, the first direction may be either horizontal (e.g., FIGS. 3E-3G) or vertical (e.g., FIGS. 4A-4E), such that the first object 112A may move into the storage location (e.g., into a second depth).

Referring now to Block 385 of FIG. 3I, the method of disposing the first object and the second object into a storage location includes disposing the first object into the storage location at a second depth. In various embodiments, the disposing of the first object may be the same as the disposing of other objects discussed herein (e.g., via the arms, as discussed in reference to Block 380 of FIG. 3H). Referring now to Block 395 of FIG. 3I, the method of disposing the first object and the second object into a storage location includes moving the second object into the original position on the shuttle. In some embodiments, the second object 112B may then be disposed into the same storage location as the first object 112A, as shown in Block 397 of FIG. 3I.

Figure 4A:
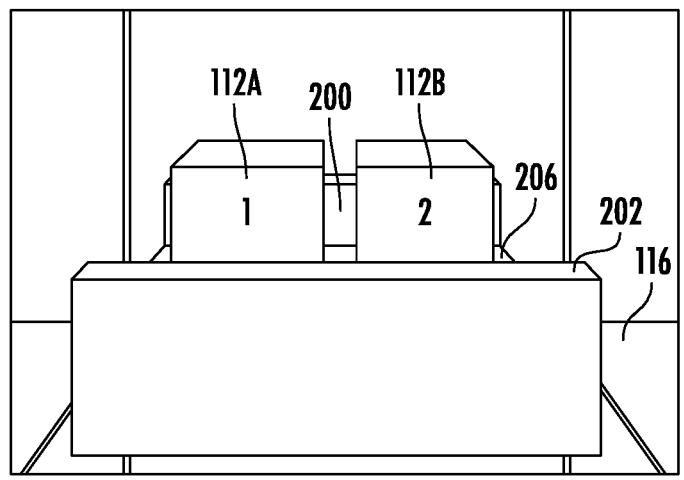
Figure 4B:
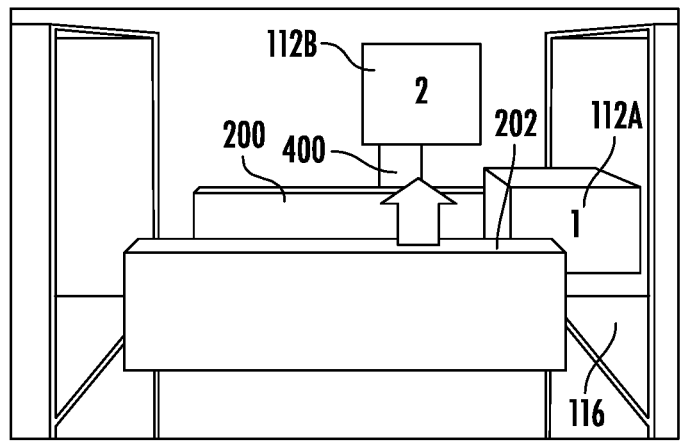
Figure 4C:
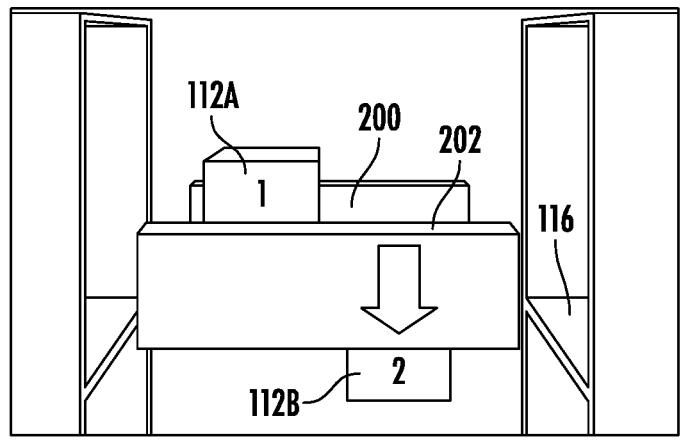

FIGS. 4A-4E illustrate another example shuttle configuration of various embodiments discussed herein. FIG. 4A illustrates a shuttle with a traditional width of slightly wider than the width of the objects to accommodate an expected size of an object (e.g., similarly to the one shown in FIG. 1B). FIGS. 4B and 4C illustrate two different variations of the example configuration. As shown, the shuttle of FIG. 4A-4C may be configured with a lifting mechanism configured to lift and/or lower an object as shown in FIGS. 4B and 4C. The operations of the shuttle of FIGS. 4A-4C correlate to the operations of FIG. 3H. As such, the first object 112A and the second object 112B may be retrieved from the same storage location via the first load arm 200 and/or the second load arm 202, as shown in Block 350 and Block 360 of FIG. 3H. The second object may then be moved in a first direction, such that the pathway for the first object to be disposed in the storage location is unobstructed by the second object (Block 370). Unlike FIGS. 3E-3F, the second object 112B may be moved in the vertical direction (e.g., up as shown in FIG. 4B or down as shown in FIG. 4C). In various embodiments, the shuttle may be configured with a lifting mechanism 400 configured to raise and lower the objects. As non-limiting examples, the lifting mechanism 400 may be a hydraulic lift, a pulley system, a gear-drive mechanism, and/or the like. Additionally, in an instance in which the second object is lowered, as shown in FIG. 4C, the shuttle may be configured with a retractable floor for the portion of the object load bed 206. In various embodiments, the retractable floor may open into multiple pieces, slide underneath the non-retractable floor, or the like. As such, the floor may open to allow the second object 112B to move in the first direction (e.g., down) before being closed once the second object 112B is returned to the original position within the load bed (Block 390).

Figure 4D:
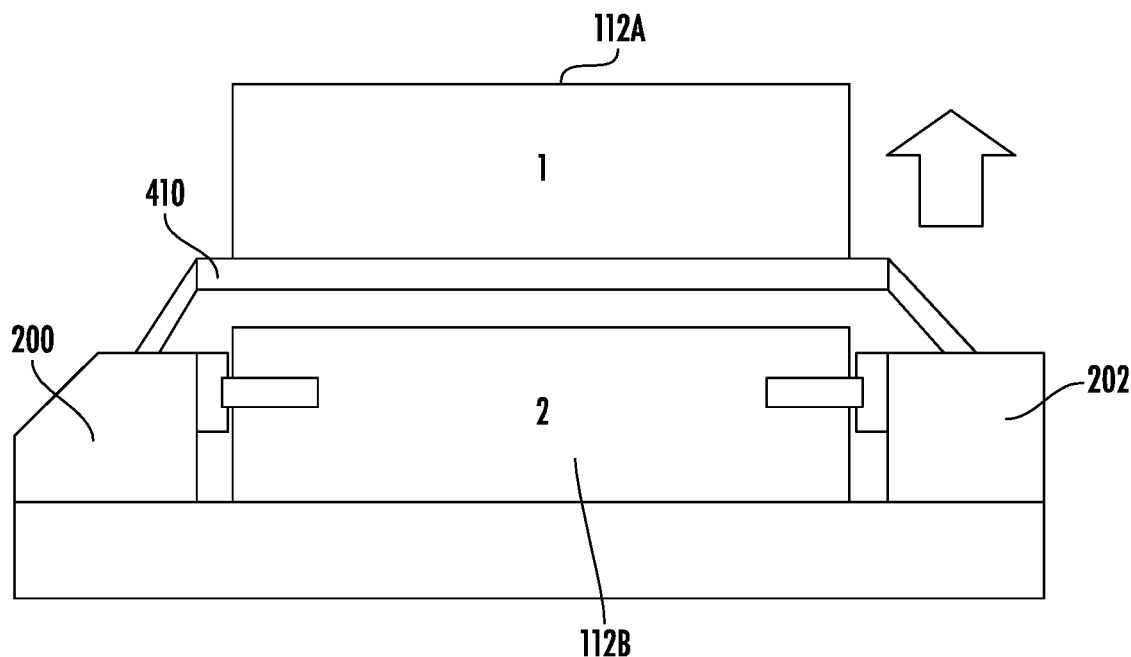
Figure 4E:
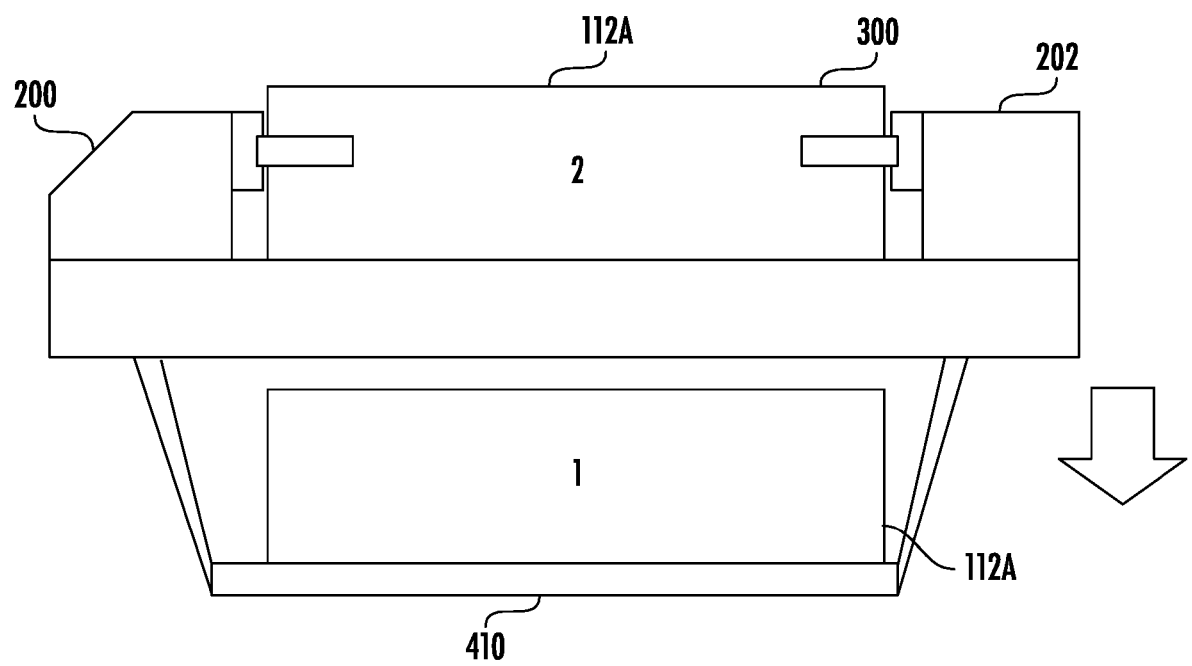

In various embodiments, such as shown in FIGS. 4D and 4E, a portion of the load bed 206 (e.g., moveable bed portion 410) may be lowered and/or raised, such that the first object 112A or the second object 112B may slide into the storage location. As shown in FIGS. 4D and 4E, the operations may lift the first object 112A in an instance the second object 112B is being loaded into the storage location. As such, the inverse may occur in an instance in which the second object 112B is being removed from the location storage. For example, the second object 112B may be lifted or lowered as shown in FIGS. 4B and 4C to allow the first object 112A to be disposed back into the storage location. Various examples discussed herein may allow for selective unloading and loading from a given storage location as discussed in reference to FIGS. 4D and 4E.

In an example lowering instance, the first object 112A may slide over top of the second object 112B. In an example raising instance, the load bed 206 may define a surface beneath the portion of the load bed 206 that is being raised, such that the first object 112A may slide back into the storage location. In various embodiments encompassing multiple shuttles each operating at different corresponding levels of the storage rack, temporary storage locations (e.g., different storage locations) may be used to avoid deadlock conditions defined as an instance in which the lifted or lowered object interferes with another shuttle operation. As such, in an instance in which two shuttle may be at the same horizontal position in adjacent levels at the same time, one of the shuttles may, before lifting or lowering the first object 112A, move horizontally along the shuttle track and align with another "temporary" storage location that is different from the storage location from which the first object 112A and the second object 112B were retrieved. In such an example, the operations may be carried out with the first object 112A being disposed into the temporary storage location instead of the original storage location 116 as shown in Block 480 of FIG. 3. In various embodiments, the shuttle may continue the other operations relating to moving the second object 112B and after disposing the second object 112B at the intended location, the shuttle may be configured to retrieve the first object 112A and return said object to the original storage location 116. In various embodiments, only one of the adjacent shuttles may be need to use a temporary storage location, such that the number of temporary storage locations is reduced over the current methods discussed above. In various embodiments, in an instance in which adjacent shuttle may experience a deadlock condition, one of the shuttles may be configured to be held at another location along the shuttle guide until the deadlock condition no longer exists (e.g., one of the shuttles finishes retrieving or disposing objects at the potential deadlock location).

In various embodiments, the motor discussed in various embodiments, may be used with the lifting mechanism 400 and/or the retractable flooring. Alternatively, the lifting mechanism 400 may be independent of the motor used to move the shuttle. Additionally, various sensors may be used to determine the location of the objects (e.g., during the lifting or lowering process) and also the location of other shuttles (e.g., in order to avoid a lifted or lowered object from interfering with a shuttle on another level).

Figure 5A:
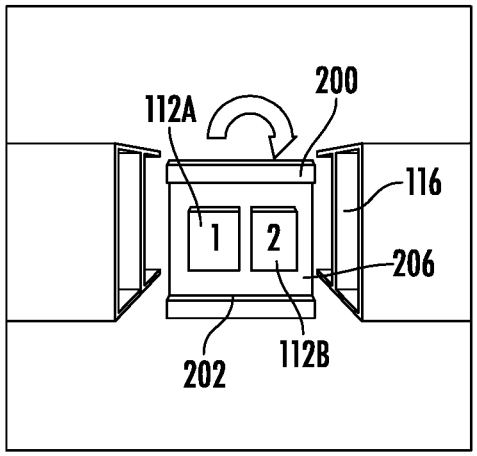
FIGS. 5A-5E illustrate the movement of objects on a shuttle in accordance with yet another example embodiment.
Figure 5B:
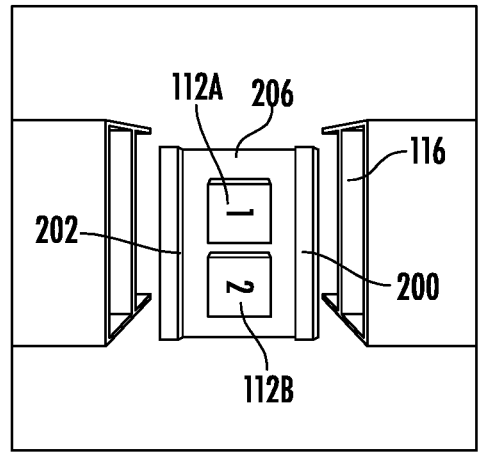
Figure 5C:
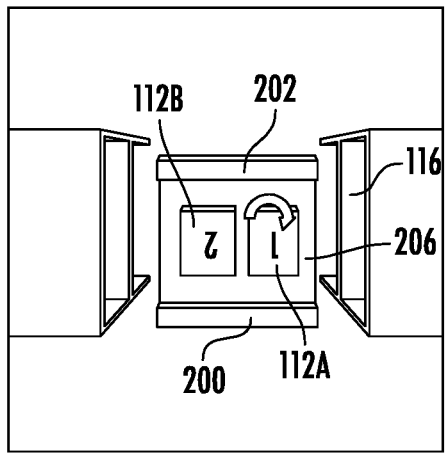
Figure 5D:
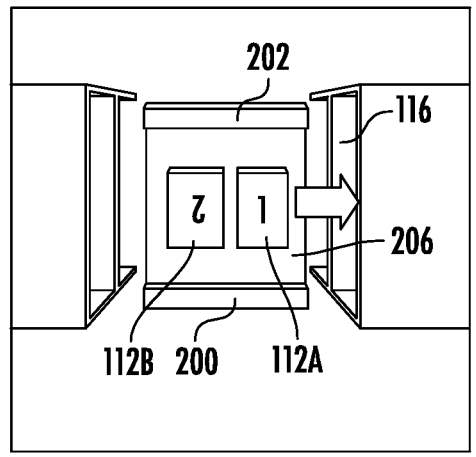
Figure 5E:
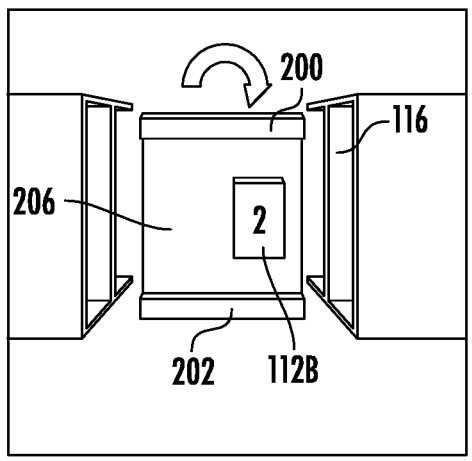
Figure 5F:
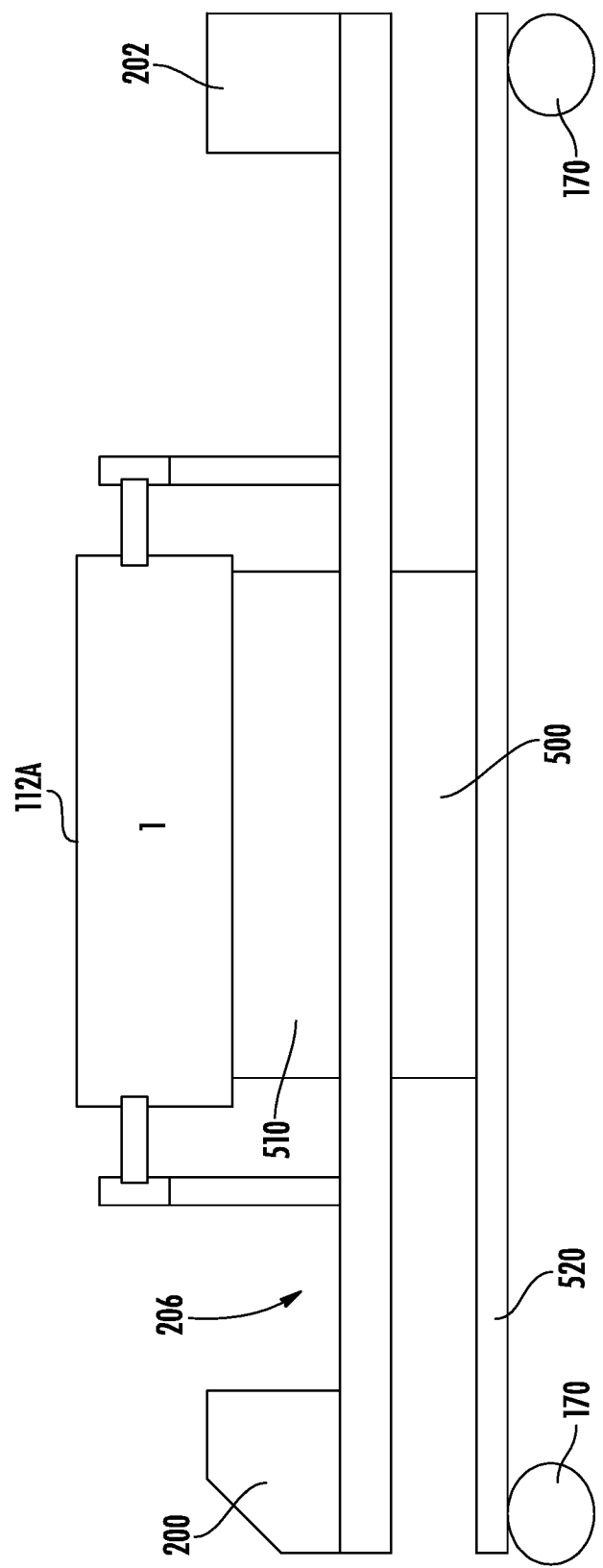
FIG. 5F is a side view of an example shuttle for usage in the operations of FIG. 5A-5E in accordance with an example embodiment.
Figure 5G:
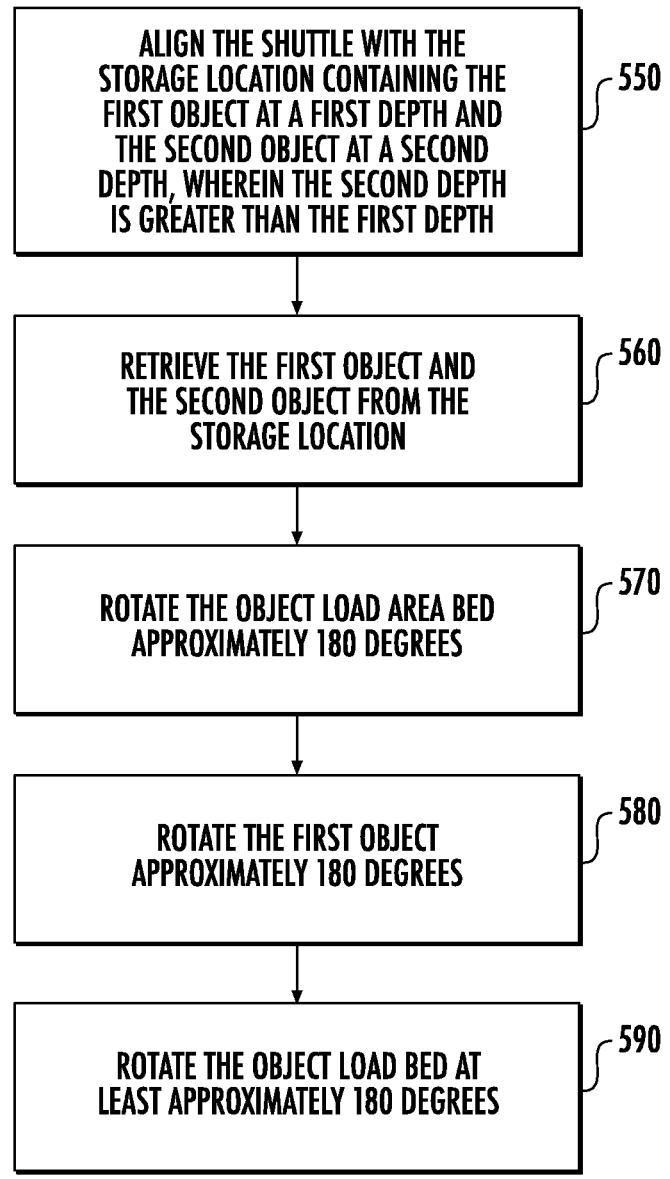
FIG. 5G is a flowchart of retrieval operations of a shuttle in accordance with an example embodiment, such as the shuttle shown in FIGS. 5A-5F.

FIGS. 5A-5E illustrate the operations of yet another shuttle configuration in accordance with various embodiments of the present disclosure. As shown, the shuttle may be sized to accommodate a single object thereon (e.g., width slightly larger than the width of an object). FIG. 5G is a flowchart that illustrates the operations of shuttle, such as the one shown in FIGS. 5A-5F, in accordance with various embodiments. FIG. 5F shows a side view of an example shuttle for usage in the operations discussed in reference to FIGS. 5A-5E and the flowchart of FIG. 5G. As shown, the shuttle may include a load bed rotation mechanism 500 configured to rotate the load bed 206 as discussed herein. Additionally, the shuttle may include an individual object rotation mechanism 510 configured to only rotate a single object (e.g., the first object 112A). Referring now to Block 550 and Block 560 of FIG. 5G, the method of retrieving the second object 112B may include aligning the shuttle with the storage location containing the first object at a first depth and the second object at a second depth, wherein the second depth is greater than the first depth, and retrieving the first object and the second object from the storage location. In various embodiments, the first object 112A and the second object 112B may be retrieved via the first load arm 200 and/or the second load arm 202, as discussed in reference to FIG. 4A. The position of the retrieved first object 112A and second object 112B is shown in FIG. 5A. As shown in Block 570 of FIG. 5G and shown in FIGS. 5B and 5C, the object load bed 206 may be rotated approximately 180 degrees, such that the first object is closer to original storage location 116. In various embodiments, the entirety of the shuttle may be rotated via the load bed rotation mechanism 500. Alternatively, part of the shuttle may remain stationary (e.g., part 520 of the shuttle, including the wheels 170 that engage the shuttle track) and the object load bed 206 may rotate, as shown in FIG. 5F, via the load bed rotation mechanism 500. As shown in Block 580 of FIG. 5G and also illustrated in FIG. 5D, the shuttle may be configured to rotate the first object 112A approximately 180 degrees. In some embodiments, the first object may be rotated via the individual object rotation mechanism 510. As such, the individual object rotation mechanism 510 may rotate independent of the load bed 206, such that only the object (e.g., the first object 112A) on the individual object rotation mechanism 510 is rotated. In various embodiments, the rotation of the object load bed 206 and the first object 112A may be created via a single rotational force mechanism (e.g., the shuttle may have a switch between a rotational force mechanism and the object load bed 206. In various embodiments, the first object 112A may then be disposed into the storage location. As shown in Block 590 of FIG. 5G and also in FIG. 5E, the object load bed 206 may then be rotated at least approximately 180 degrees. In some embodiments, the load bed 206 may be rotated back to the original orientation (e.g., rotated approximately 180 degrees back to the orientation shown in FIG. 5A). As with the other example embodiments, the shuttle may then move the second object to the intended destination (e.g., a vertical lift 110 and ultimately the outfeed conveyor 108). Various embodiments described herein may also be used to move objects from one storage location to another.

Figure 5H:
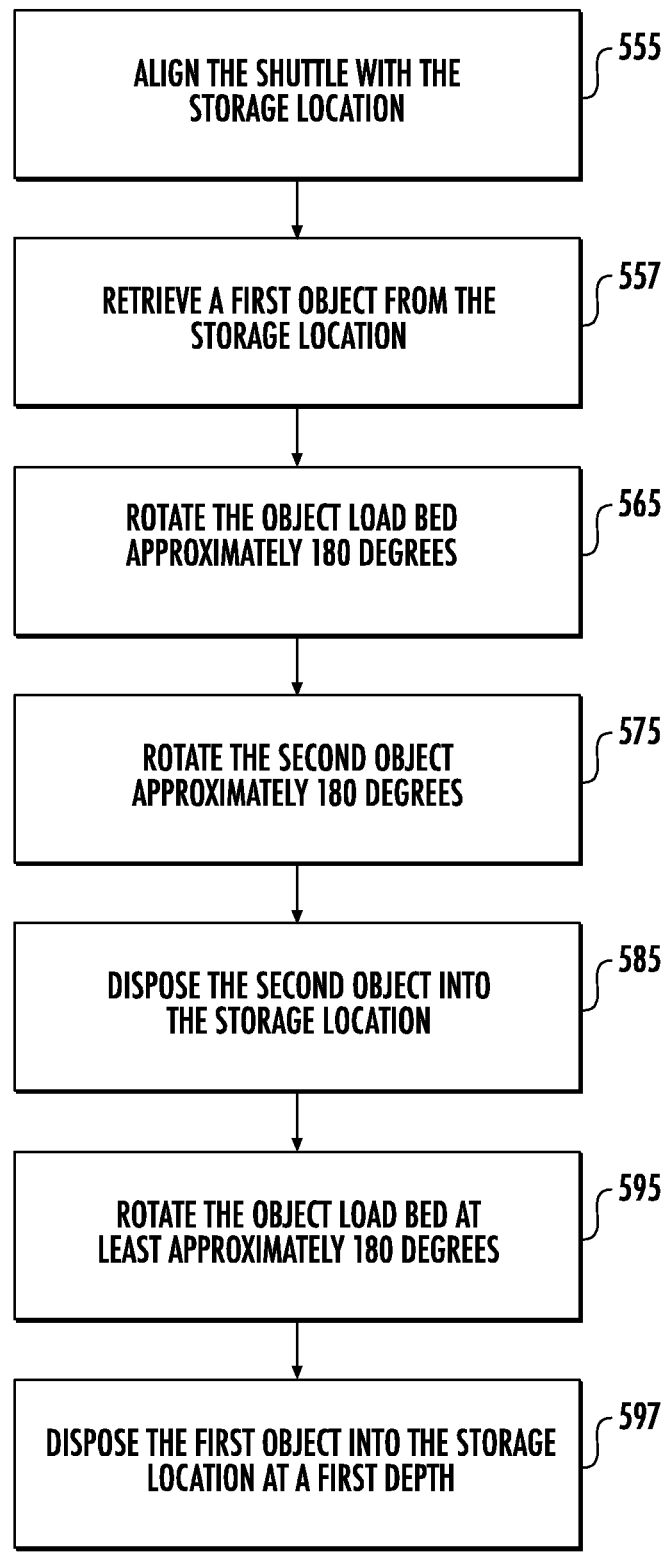
FIG. 5H is a flowchart of disposal operations of a shuttle in accordance with an example embodiment, such as the shuttle shown in FIGS. 5A-5F.

FIG. 5H is a flowchart that illustrates the operations of shuttle, such as the one shown in FIGS. 5A-5F, in accordance with various embodiments. The operations of FIG. 5H are similar to the operations discussed in FIG. 5G for an instance in which the first object 112A is loaded on the load bed between the second object 112B and the storage location. Referring now to Block 555 of FIG. 5H, the method of disposing the first object and the second object into a storage location includes aligning the shuttle with the shuttle location as discussed in reference to Block 550. Referring now to Block 557 of FIG. 5H, the method of disposing the first object and the second object into a storage location includes retrieving a first object from the storage location. The first object and the second object may be retrieved via the first arm 200 and/or the second arm 202 as discussed herein. As shown in Block 565 of FIG. 5H, the object load bed 206 may be rotated approximately 180 degrees, such that the second object 112B is moved closer to the target storage location. In various embodiments, the entirety of the shuttle may be rotated via the load bed rotation mechanism 500. Alternatively, part of the shuttle may remain stationary (e.g., part 520 of the shuttle, including the wheels 170 that engage the shuttle track) and the object load bed 206 may rotate, as shown in FIG. 5F, via the load bed rotation mechanism 500. As shown in Block 575 of FIG. 5H, the shuttle may be configured to rotate the second object 112B approximately 180 degrees. In some embodiments, the second object 112B may be rotated via the individual object rotation mechanism 510. In various embodiments, the individual object rotation mechanism 510 may be configured as a portion of the load bed 206 configured to rotate (e.g., via hydraulics, motorized operation, and/or the like). In some embodiments, the individual object rotation mechanism 510 may be a raised surface (e.g., as shown in FIG. 5F). In various embodiments, the individual object rotation mechanism 510 may rotate independent of the load bed 206, such that only the object (e.g., the second object 112B) on the individual object rotation mechanism 510 is rotated. In various embodiments, the rotation of the object load bed 206 and the second object 112B may be created via a single rotational force mechanism (e.g., the shuttle may have a switch between a rotational force mechanism and the object load bed 206.

Referring now to Block 585 of FIG. 5H, the method may also include disposing the second object into the storage location. The second object 112B may be disposed into the storage location using the first load arm 200 and/or the second load arm 202. In various embodiments, the second object 112B may be disposed at a second depth, such that another object may be placed at a first depth within the storage location that is less than the second depth. Referring now to Block 595 of FIG. 5H, the method may include rotating the object load bed 206 at least approximately 180 degrees. In some embodiments, the load bed 206 may be rotated back to the original orientation (e.g., rotated approximately 180 degrees back to the orientation shown in FIG. 5A). As with the other example embodiments, the shuttle may then move the first object 112A into the storage location (e.g., at a first depth in front of the second object 112B). Referring now to Block 597 of FIG. 5H, the method of disposing the first object and the second object into a storage location includes disposing the first object into the storage location at a first depth. As discussed herein, the first object may be disposed into the same storage location as the second object, at a depth less than the second object. In various embodiments, the first object may be disposed into the storage location via the first arm 200 and/or the second arm 202.

Various operations discussed herein may be carried out by a controller with a processor or the like. As such, the operations may be autonomous (e.g., a program determines the operations of the shuttle) and/or manual (e.g., a user may control at least a portion of the shuttle operations discussed herein). As discussed above, the operations discussed herein allow for a reduction in required reserve spaces and/or reduces the amount of unnecessary operations performed by the shuttles during operation. Various embodiments discussed herein allow for more efficient retrieval and storage using an AS/RS.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance unless otherwise noted, but rather the terms first, second, etc. are used to distinguish one element from another.

In accordance with various aspects of the disclosure, an element, or any portion of an element, or any combination of elements may be implemented with a "processor." The processor may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like.

In an example embodiment, the processor may be configured to execute instructions stored in a memory device or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method of retrieving an object from a multi-depth object storage, the method comprising:
    retrieving, via a shuttle, at least a first object from a first depth of a storage location and a second object from a second depth of the storage location, wherein the first depth is less than the second depth, such that the first object positioned at the first depth of the storage location interferes with retrieval of the second object positioned at the second depth of the storage location;
    manipulating the first object and the second object, such that the first object is positioned to be disposed into the storage location while the second object remains disposed on the shuttle; and
    disposing the first object into the storage location while the second object remains on the shuttle.

2. The method of claim 1, wherein the shuttle defines an object load bed, wherein the object load bed is configured to hold the first object and the second object upon retrieval from the storage location.

3. The method of claim 2, wherein the shuttle comprises at least a first shuttle load arm and a second shuttle load arm configured along the sides of the object load bed, wherein each of the shuttle load arms define one or more fingers configured to engage with the given object during operation.

4. The method of claim 3, wherein the object load bed defines a first chamber and a second chamber, wherein the first chamber and the second chamber are each configured to support at least one object therein.

5. The method of claim 4, wherein the shuttle defines a third shuttle load arm that is at least substantially centrally located relative to the width of the object load bed.

6. The method of claim 5, wherein the third shuttle load arm separates the first chamber and the second chamber and retrieving the first object and the second object from the storage location comprises:
    retrieving the first object via the first shuttle load arm and the third shuttle load arm such that the first object is disposed in the first chamber of the object load bed;
    moving the shuttle, such that the second chamber is aligned with the storage location; and retrieving the second object via the second shuttle load arm and the third shuttle load arm such that the second object is disposed in the second chamber of the object load bed.

7. The method of claim 4, wherein the shuttle defines a third shuttle load arm that is at least substantially centrally located relative to the width of the object load bed and a fourth shuttle load arm positioned adjacent to the third shuttle load arm that is at least substantially centrally located relative to the width of the object load bed, wherein the third shuttle load arm comprises one or more fingers configured to engage with objects in the first chamber and the fourth shuttle load arm comprises one or more fingers configured to engage with objects in the second chamber.

8. The method of claim 3, wherein the object load bed comprises a lifting mechanism to move the given object in a first direction during operation, wherein the manipulating the first object and the second object comprises moving the second object in the first direction, via the lifting mechanism, such that the first object may be disposed into the storage location, wherein the first direction is defined in a vertical or horizontal direction.

9. The method of claim 3, wherein the manipulating the first object and the second object comprises rotating the object load bed of the shuttle at least approximately 180 degrees such that the first object may be disposed into the storage location while the second object remains on the shuttle.

10. The method of claim 2, wherein the shuttle comprises at least a first shuttle load arm and a second shuttle load arm, wherein the first shuttle load arm is configured along one of the sides of the object load bed and the second shuttle load arm is configured at approximately a center of the object load bed, wherein each of the shuttle load arms define one or more fingers configured to engage with the given object during operation.

11. The method of claim 10, wherein the shuttle further comprises one or more pushing mechanisms to move the given object laterally.

12. A shuttle configured for retrieving an object from a multi-depth object storage, the shuttle comprising an object load bed configured to hold at least a first object and a second object upon retrieval from a storage location and a plurality of shuttle load arms, each shuttle load arm with at least one finger, the shuttle configured to:
retrieve at least the first object from a first depth of the storage location and the second object from a second depth of the storage location, wherein the first depth is less than the second depth, such that the first object positioned at the first depth of the storage location interferes with retrieval of the second object positioned at the second depth of the storage location;
manipulate the first object and the second object, such that the first object is positioned to be disposed into the storage location while the second object remains disposed on the shuttle; and
dispose the first object into the storage location while the second object remains on the shuttle.

13. The shuttle of claim 12, wherein the shuttle comprises at least a first shuttle load arm and a second shuttle load arm configured along the sides of the object load bed, wherein each of the shuttle load arms define one or more fingers configured to engage with the given object during operation.

14. The shuttle of claim 13, wherein the object load bed defines a first chamber and a second chamber, wherein the first chamber and the second chamber are each configured to support at least one object therein.

15. The shuttle of claim 14, wherein the shuttle further comprises a third shuttle load arm that is at least substantially centrally located relative to the width of the object load bed.

16. The shuttle of claim 15, wherein the third shuttle load arm separates the first chamber and the second chamber and is configured to:
retrieve the first object via the first shuttle load arm and the third shuttle load arm such that the first object is disposed in the first chamber of the object load bed;
move the shuttle, such that the second chamber is aligned with the storage location; and
retrieve the second object via the second shuttle load arm and the third shuttle load arm such that the second object is disposed in the second chamber of the object load bed.

17. The shuttle of claim 12, further comprising at least a first shuttle load arm and a second shuttle load arm, wherein the first shuttle load arm is configured along one of the sides of the object load bed and the second shuttle load arm is configured at approximately a center of the object load bed, wherein each of the shuttle load arms define one or more fingers configured to engage with the given object during operation.

18. The shuttle of claim 17, further comprising one or more pushing mechanisms to move the given object laterally.

19. The shuttle of claim 17, wherein the object load bed comprises a lifting mechanism to move the given object in a first direction during operation, wherein the manipulating the first object and the second object comprises moving the second object in the first direction, via the lifting mechanism, such that the first object may be disposed into the storage location, wherein the first direction is defined in a vertical or horizontal direction.

20. The shuttle of claim 17, wherein the manipulating the first object and the second object comprises rotating the object load bed of the shuttle approximately 180 degrees such that the first object may be disposed into the storage location in an instance the second object remains on the shuttle.

* * * * *